US012809279B2

(12) United States Patent
Okazaki et al.

(10) Patent No.: US 12,809,279 B2
(45) Date of Patent: Nov. 24, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Yuto Okazaki, Kanagawa (JP); Kosuke Narita, Kanagawa (JP); Tomoya Sasaki, Kanagawa (JP); Hiroko Kobayashi, Kanagawa (JP); Ryosuke Fujii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 553 days.

(21) Appl. No.: 18/321,800

(22) Filed: May 23, 2023

(65) Prior Publication Data

US 2024/0053689 A1 Feb. 15, 2024

(30) Foreign Application Priority Data

Aug. 1, 2022 (JP) ................................. 2022-122722

(51) Int. Cl.
*G03G 5/047* (2006.01)
*C08G 63/193* (2006.01)
(Continued)

(52) U.S. Cl.
CPC ........... *G03G 5/047* (2013.01); *C08G 63/193* (2013.01); *C08G 63/672* (2013.01); *G03G 5/056* (2013.01); *G03G 21/1803* (2013.01)

(58) Field of Classification Search
CPC .... G03G 5/047; G03G 5/056; G03G 21/1803; C08G 63/193; C08G 63/672
See application file for complete search history.

(56) References Cited

U.S. PATENT DOCUMENTS 10,539,888 B2 1/2020 Kaku et al.
11,106,147 B2 8/2021 Kudoh
(Continued)

FOREIGN PATENT DOCUMENTS

JP H01161244 6/1989
JP 2855609 2/1999
(Continued)

OTHER PUBLICATIONS

"Notice of Reasons for Refusal of Japan Counterpart Application", issued on Jul. 7, 2026, with English translation thereof, p. 1-p. 8.
(Continued)

*Primary Examiner* — Boone Alexander Evans
(74) *Attorney, Agent, or Firm* — JCIPRNET

(57) ABSTRACT

An electrophotographic photoreceptor includes a conductive substrate, and a lamination type photosensitive layer including a charge generation layer and a charge transport layer or a single layer type photosensitive layer that is a photosensitive layer disposed on the conductive substrate, in which the charge transport layer or the single layer type photosensitive layer is an outermost layer and contains a charge transport material and a binder resin containing a polyester resin having an aromatic ring, the charge transport layer or the single layer type photosensitive layer has an average thickness of 28 μm or greater and 50 μm or less, and a weight reduction ratio of the charge transport layer or the single layer type photosensitive layer from 30° C. to 175° C. in thermogravimetric analysis is 0.1% by mass or less.

18 Claims, 3 Drawing Sheets

(51) Int. Cl.

| | |
|---|---|
| ***C08G 63/672*** | (2006.01) |
| ***G03G 5/05*** | (2006.01) |
| ***G03G 21/18*** | (2006.01) |

(56) References Cited

U.S. PATENT DOCUMENTS

| | | | |
|---|---|---|---|
| 11,188,002 B2 | 11/2021 | Choda et al. | |
| 2011/0020739 A1 | 1/2011 | Nakamura et al. | |
| 2015/0056547 A1* | 2/2015 | Murakami | G03G 5/051 430/70 |
| 2019/0219938 A1 | 7/2019 | Yoshizawa | |
| 2019/0384189 A1* | 12/2019 | Nagao | G03G 5/0571 |
| 2021/0286277 A1 | 9/2021 | Shimizu | |

FOREIGN PATENT DOCUMENTS

| | | |
|---|---|---|
| JP | 2000267308 | 9/2000 |
| JP | 2008033140 | 2/2008 |
| JP | 2008033145 | 2/2008 |
| JP | 4078748 | 4/2008 |
| JP | 2010113117 | 5/2010 |
| JP | 2011028041 | 2/2011 |
| JP | 2011186153 | 9/2011 |
| JP | 2013097300 | 5/2013 |
| JP | 2013218305 | 10/2013 |
| JP | 2018159087 | 10/2018 |
| JP | 2019012141 | 1/2019 |
| JP | 2019035900 | 3/2019 |
| JP | 2021015223 | 2/2021 |
| JP | 2021071565 | 5/2021 |
| JP | 2021117377 | 8/2021 |
| JP | 2021148818 | 9/2021 |
| WO | 2013137282 | 9/2013 |
| WO | 2018056326 | 3/2018 |
| WO | 2019070003 | 4/2019 |

OTHER PUBLICATIONS

"Notice of Reasons for Refusal of Japan Counterpart Application", issued on Sep. 29, 2026, with English translation thereof, p. 1-p. 5.

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-122722 filed Aug. 1, 2022.

BACKGROUND

(i) Technical Field

The present disclosure relates to an electrophotographic photoreceptor, a process cartridge, and an image forming apparatus.

(ii) Related Art

JP1989-161244A (JP-H1-161244A) discloses a photoreceptor in which a photosensitive layer formed on a conductive substrate contains 0.05% to 5% by weight of cyclohexanone.

JP2000-267308A discloses an electrophotographic photoreceptor obtained by sequentially forming a charge generation layer and a charge transport layer on a metal layer of a conductive support consisting of a flexible resin film on which the metal layer is laminated, in which the film thickness of the charge transport layer is 21 μm or greater, and the residual solvent amount in the charge transport layer is in a range of 10 $mg/cm^3$ to 100 $mg/cm^3$.

JP2010-113117A discloses an electrophotographic photoreceptor obtained by laminating an organic photosensitive layer and a curable surface layer on a conductive substrate, in which the organic photosensitive layer contains an antioxidant in which a weight reduction starting temperature in thermogravimetric analysis (TGA) is 200° C. or higher in a nitrogen atmosphere.

SUMMARY

Aspects of non-limiting embodiments of the present disclosure relate to an electrophotographic photoreceptor including a conductive substrate, and a lamination type photosensitive layer or a single layer type photosensitive layer, in which a charge transport layer of the lamination type photosensitive layer or the single layer type photosensitive layer is an outermost layer, has an average thickness of 28 μm or greater and 50 μm or less, and contains a charge transport material and a binder resin, and both abrasion resistance and suppression of filming are achieved as compared with a case where the binder resin is formed of only a polycarbonate resin or a case where a weight reduction ratio of the charge transport layer or the single layer type photosensitive layer from 30° C. to 175° C. in thermogravimetric analysis is greater than 0.1% by mass.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above-described object includes the following aspect.

According to an aspect of the present disclosure, there is provided an electrophotographic photoreceptor that includes a conductive substrate, and a lamination type photosensitive layer including a charge generation layer and a charge transport layer or a single layer type photosensitive layer that is a photosensitive layer disposed on the conductive substrate, in which the charge transport layer or the single layer type photosensitive layer is an outermost layer and contains a charge transport material and a binder resin containing a polyester resin having an aromatic ring, the charge transport layer or the single layer type photosensitive layer has an average thickness of 28 μm or greater and 50 μm or less, and a weight reduction ratio of the charge transport layer or the single layer type photosensitive layer from 30° C. to 175° C. in thermogravimetric analysis is 0.1% by mass or less.

BRIEF DESCRIPTION OF THE DRAWINGS

Exemplary embodiment(s) of the present invention will be described in detail based on the following figures, wherein.

DETAILED DESCRIPTION

Figure 1:
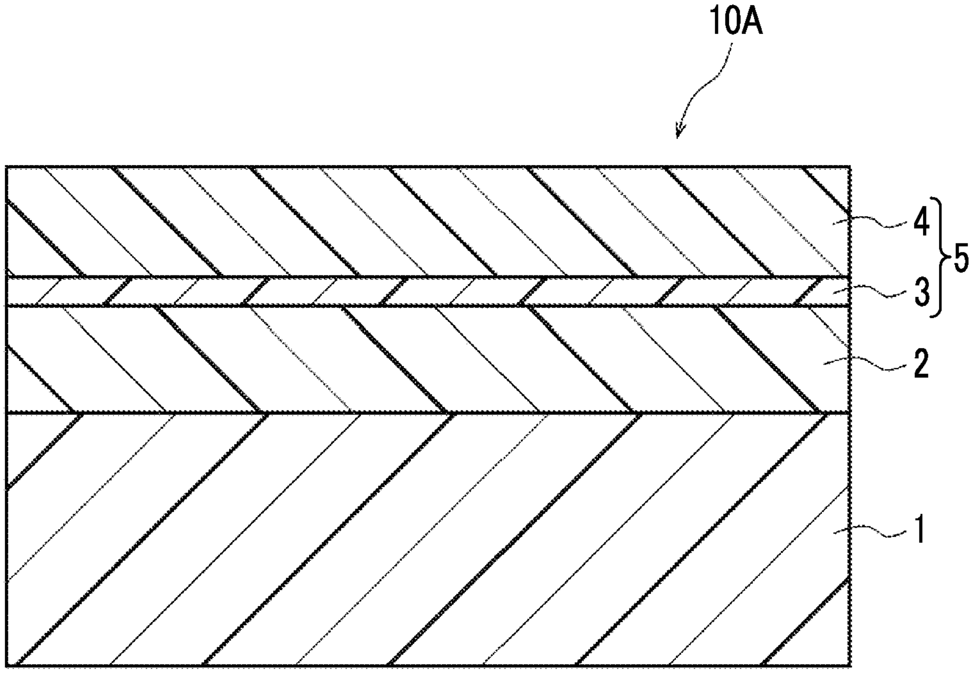
FIG. 1 is a partial cross-sectional view showing an example of a layer configuration of an electrophotographic photoreceptor according to a first exemplary embodiment.

Hereinafter, exemplary embodiments of the present disclosure will be described. The following descriptions and examples merely illustrate the exemplary embodiments, and do not limit the scope of the exemplary embodiments.

In the present disclosure, a numerical range shown using "to" indicates a range including numerical values described before and after "to" as a minimum value and a maximum value.

In a numerical range described in a stepwise manner in the present disclosure, an upper limit value or a lower limit value described in a certain numerical range may be replaced with an upper limit value or a lower limit value in another numerical range described in a stepwise manner. Further, in a numerical range described in the present disclosure, an upper limit value or a lower limit value described in the numerical range may be replaced with a value shown in examples.

In the present disclosure, the meaning of the term "step" includes not only an independent step but also a step whose intended purpose is achieved even in a case where the step is not clearly distinguished from other steps.

In the present disclosure, in a case where an exemplary embodiment is described with reference to drawings, the configuration of the exemplary embodiment is not limited to the configuration shown in the drawings. In addition, the sizes of members in each drawing are conceptual and the relative relation in the sizes between the members is not limited thereto.

In the present disclosure, each component may include a plurality of kinds of substances corresponding to each component. In the present disclosure, in a case where a plurality of kinds of substances corresponding to each component in a composition are present, the amount of each component in the composition indicates the total amount of the plurality of kinds of substances present in the composition unless otherwise specified.

In the present disclosure, each component may include a plurality of kinds of particles corresponding to each component. In a case where a plurality of kinds of particles corresponding to each component are present in a composition, the particle diameter of each component indicates the value of a mixture of the plurality of kinds of particles present in the composition, unless otherwise specified.

In the present disclosure, an alkyl group is any of linear, branched, or cyclic unless otherwise specified.

In the present disclosure, a hydrogen atom in an organic group, an aromatic ring, a linking group, an alkyl group, an aryl group, an aralkyl group, an alkoxy group, or an aryloxy group may be substituted with a halogen atom.

Electrophotographic Photoreceptor

The present disclosure provides a first exemplary embodiment and a second exemplary embodiment of an electrophotographic photoreceptor (hereinafter, also referred to as a "photoreceptor").

The photoreceptor according to the first exemplary embodiment includes a conductive substrate, and a lamination type photosensitive layer disposed on the conductive substrate and including a charge generation layer and a charge transport layer. The photoreceptor according to the first exemplary embodiment may further include other layers (for example, an undercoat layer and an interlayer). However, in the photoreceptor according to the first exemplary embodiment, the charge transport layer is the outermost layer.

The photoreceptor according to the second exemplary embodiment includes a conductive substrate, and a single layer type photosensitive layer disposed on the conductive substrate. The photoreceptor according to the second exemplary embodiment may further include other layers (for example, an undercoat layer and an interlayer). However, in the photoreceptor according to the second exemplary embodiment, the single layer type photosensitive layer is the outermost layer. Hereinafter, the lamination type photosensitive layer is also referred to as "lamination type photosensitive layer", and the single layer type photosensitive layer is also referred to as "single layer type photosensitive layer".

FIG. 1 is a partial cross-sectional view schematically showing an example of the layer configuration of the photoreceptor according to the first exemplary embodiment. A photoreceptor 10A shown in FIG. 1 includes a lamination type photosensitive layer. The photoreceptor 10A has a structure in which an undercoat layer 2, a charge generation layer 3, and a charge transport layer 4 are laminated in this order on a conductive substrate 1, and the charge generation layer 3 and the charge transport layer 4 constitute a photosensitive layer 5 (so-called function separation type photosensitive layer). The photoreceptor 10A may include an interlayer (not shown) between the undercoat layer 2 and the charge generation layer 3.

Figure 2:
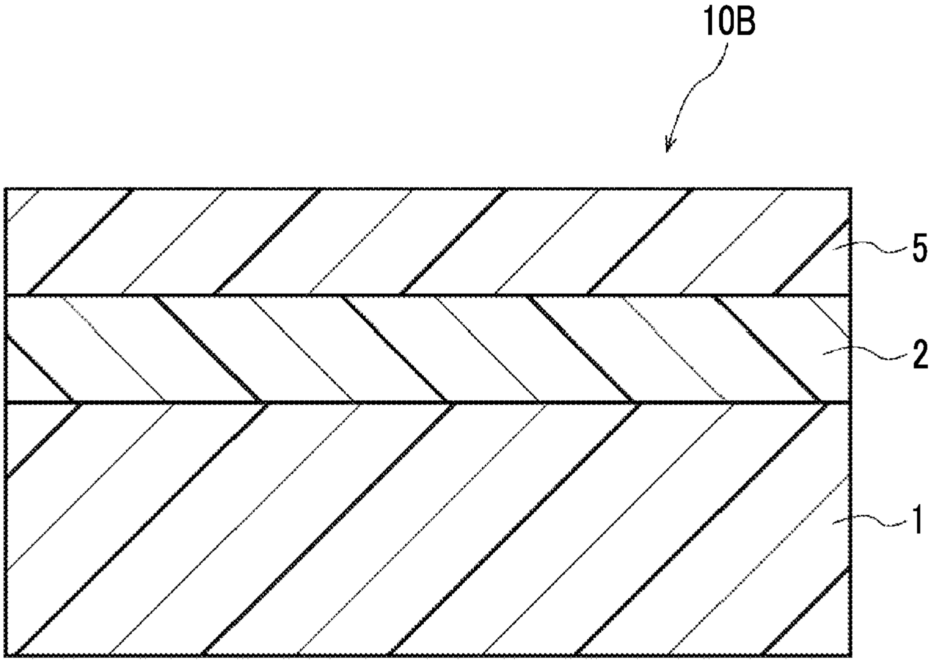
FIG. 2 is a partial cross-sectional view showing an example of a layer configuration of an electrophotographic photoreceptor according to a second exemplary embodiment.

FIG. 2 is a partial cross-sectional view schematically showing an example of the layer configuration of the photoreceptor according to the second exemplary embodiment. A photoreceptor 10B shown in FIG. 2 includes a single layer type photosensitive layer. The photoreceptor 10B has a structure in which the undercoat layer 2 and the photosensitive layer 5 are laminated in this order on the conductive substrate 1. The photoreceptor 10B may include an interlayer (not shown) between the undercoat layer 2 and the photosensitive layer 5.

In the photoreceptor according to the first exemplary embodiment, the charge transport layer is an outermost layer, has an average thickness of 28 μm or greater and 50 μm or less, and contains a charge transport material and a binder resin containing a polyester resin having an aromatic ring, and the weight reduction ratio of the charge transport layer from 30° C. to 175° C. in thermogravimetric analysis is 0.1% by mass or less.

In the photoreceptor according to the second exemplary embodiment, the single layer type photosensitive layer is an outermost layer, has an average thickness of 28 μm or greater and 50 μm or less, and contains a charge transport material and a binder resin containing a polyester resin having an aromatic ring, and the weight reduction ratio of the single layer type photosensitive layer from 30° C. to 175° C. in thermogravimetric analysis is 0.1% by mass or less.

Hereinafter, in a case of description common to the first exemplary embodiment and the second exemplary embodiment, both exemplary embodiments are collectively referred to as the present exemplary embodiment. In a case where items common to the charge transport layer and the single layer type photosensitive layer are described, both layers are collectively referred to as a photosensitive layer. Further, the weight reduction ratio of the photosensitive layer from 30° C. to 175° C. in the thermogravimetric analysis is also referred to as "weight reduction ratio of the photosensitive layer", and the weight reduction amount of the photosensitive layer from 30° C. to 175° C. in the thermogravimetric analysis is also referred to as "weight reduction amount of the photosensitive layer". Further, the weight reduction ratio of the photosensitive layer is the ratio of the weight reduction amount of the photosensitive layer to the mass of the entire photosensitive layer.

A method of using a polyester resin having an aromatic ring as a binder resin of a photosensitive layer can be considered as a method of enhancing abrasion resistance of a photosensitive layer. In the polyester resin having an aromatic ring, molecules attract each other due to an interaction between aromatic rings. Therefore, a photoreceptor using a polyester resin having an aromatic ring as a binder resin of a photosensitive layer is considered to have enhanced abrasion resistance, for example, as compared with a case where a polycarbonate resin is used as a binder resin of a photosensitive layer or a case where a polyester resin having no aromatic ring is used.

Meanwhile, in a case where image formation is continuously carried out by using a photoreceptor in which a polyester resin having an aromatic ring is applied as a binder resin of the photosensitive layer serving as the outermost layer, filming which is a phenomenon in which a toner adheres to a surface of a photoreceptor easily occurs, for example, as compared with a case where a photoreceptor in which a polycarbonate resin or the like is applied as a binder resin. In particular, in a case where the average thickness of the photosensitive layer is 28 μm or greater, the filming is more likely to occur. The reason for this is not clear, but is assumed as follows.

The photosensitive layer is formed, for example, by forming a coating film of a coating solution for forming a photosensitive layer, drying the formed coating film, and heating the coating film as necessary. In the photosensitive layer containing a polyester resin having an aromatic ring, since molecules attract each other due to the interaction between the aromatic rings as described above, a large amount of energy is required for densification of the film in the drying step. In particular, in a case where a photosensitive layer having an average thickness of 28 μm or greater is formed, more energy is required. Therefore, the photosensitive layer containing a polyester resin having an aromatic ring is considered to be that densification is likely to be insufficient, for example, as compared with a case where a polycarbonate resin is used as the binder resin for the photosensitive layer or a case where a polyester resin having no aromatic ring is used. Particularly, in a case where the coating solution for forming a photosensitive layer contains a volatile component that vaporizes at 100° C. or higher and 175° C. or lower, the energy applied in the drying step is taken away due to the vaporization of the volatile component and is insufficient, and thus the photosensitive layer is likely to be insufficiently densified.

In the photosensitive layer with insufficient densification, a plurality of micro-voids are present, and the film hardness and the viscoelasticity may be uneven. Further, in a case where a portion with locally poor strength is present, an external additive of the toner is likely to be embedded during the image formation, and the portion is likely to be a starting point of filming.

On the contrary, in the present exemplary embodiment, since the photosensitive layer contains a polyester resin having an aromatic ring, and the weight reduction ratio of the photosensitive layer is in the above-described ranges, filming is suppressed while abrasion resistance is obtained. The reason for this is not clear, but is assumed as follows.

The energy required for vaporization of the volatile component and the energy sufficient for densification of the film are applied to the photosensitive layer in which the weight reduction ratio is in the above-described ranges in a step of drying a coating film of a coating solution for forming a photosensitive layer. Therefore, it is assumed that filming is unlikely to occur because the unevenness of the film hardness and the viscoelasticity is small and the number of portions where the hardness is locally poor is small.

For the above-described reasons, it is assumed that the photoreceptor according to the present exemplary embodiment has both abrasion resistance and suppression of filming.

It is preferable that the photosensitive layer further contains, for example, an antioxidant.

In a case where the photosensitive layer contains an antioxidant, the occurrence of filming is further suppressed.

The reason why the occurrence of filming is further suppressed by the photosensitive layer containing an antioxidant as compared with a case where the photosensitive layer contains no antioxidant is considered as follows.

In a case where the photosensitive layer contains an antioxidant, oxidative deterioration of a discharge product adhering to an outer peripheral surface of the photosensitive layer is suppressed due to discharge. In this manner, it is assumed that the adsorption of moisture on the outer peripheral surface of the photosensitive layer is suppressed, an increase in hydrophilicity is also suppressed, the adhesion of an external additive is decreased, and thus the filming is suppressed.

Weight Reduction Ratio of Photosensitive Layer and Ratio of Weight Reduction Amount to Total Amount of Binder Resin In the present exemplary embodiment, the weight reduction ratio of the photosensitive layer, that is, the weight reduction ratio of the photosensitive layer from 30° C. to 175° C. in the thermogravimetric analysis is 0.1% by mass or less, and from the viewpoint of suppressing filming, the weight reduction ratio thereof is, for example, preferably 0.08% by mass or less and more preferably 0.06% by mass or less. The lower limit of the weight reduction ratio of the photosensitive layer is not particularly limited and may be, for example, 0.01% by mass.

In a case where the photosensitive layer contains an antioxidant, the weight reduction ratio of the photosensitive layer is, for example, preferably 0.01% by mass or greater, more preferably 0.03% by mass or greater, and still more preferably 0.05% by mass or greater from the viewpoint of obtaining an effect of suppressing burn-in ghosts using the antioxidant described below. Here, "burn-in ghosts" are image defects in which the surface potential of a portion of the photoreceptor with a large exposure history decreases and thus the density of a halftone image increases. In a case where the photosensitive layer contains an antioxidant, the weight reduction ratio of the photosensitive layer is, for example, preferably 0.01% by mass or greater and 0.1% by mass or less, more preferably 0.03% by mass or greater and 0.08% by mass or less, and still more preferably 0.05% by mass or greater and 0.06% by mass or less from the viewpoint of achieving both suppression of burn-in ghosts and suppression of filming.

In the present exemplary embodiment, the weight reduction amount of the photosensitive layer, that is, the weight reduction amount of the photosensitive layer from 30° C. to 175° C. in the thermogravimetric analysis is, for example, preferably 0.18% by mass or less, more preferably 0.14% by mass or less, and still more preferably 0.11% by mass or less with respect to the total amount of the binder resin. In a case where the ratio of the weight reduction amount of the photosensitive layer to the total amount of the binder resin is in the above-described ranges, the filming is suppressed as compared with a case where the ratio thereof is greater than the above-described ranges. The lower limit of the ratio of the weight reduction amount of the photosensitive layer to the total amount of the binder resin is not particularly limited and may be, for example, 0.02% by mass.

In a case where the photosensitive layer contains an antioxidant, from the viewpoint of obtaining the effect of suppressing burn-in ghosts using an antioxidant, the weight reduction amount of the photosensitive layer is, for example, preferably 0.02% by mass or greater, more preferably 0.05% by mass or greater, and still more preferably 0.08% by mass or greater with respect to the total amount of the binder resin. In a case where the photosensitive layer contains an antioxidant, from the viewpoint of achieving both suppression of burn-in ghosts and suppression of filming, the weight reduction amount of the photosensitive layer is, for example, preferably 0.02% by mass or greater and 0.18% by mass or less, more preferably 0.05% by mass or greater and 0.14% by mass or less, and still more preferably 0.08% by mass or greater and 0.11% by mass or less with respect to the total amount of the binder resin.

The weight reduction ratio of the photosensitive layer and the ratio of the weight reduction amount to the total amount of the binder resin are measured as follows.

The photosensitive layer is peeled off from the electrophotographic photoreceptor and cut to prepare a measurement sample which has a size of 2 mm square and the same thickness as the thickness of the layer to be measured. Further, the weight reduction amount is acquired from the weights of the prepared measurement sample before and after the temperature thereof is increased from 30° C. to 175° C. at 10° C./min using a TG/DTA Simultaneous Measuring Instrument (model number: DTG-60, manufactured by Shimadzu Corporation). The weight reduction ratio of the photosensitive layer and the ratio of the weight reduction amount to the total amount of the binder resin are calculated from these values.

Average Thickness of Photosensitive Layer and Value of W×T

The average thickness of the charge transport layer in the first exemplary embodiment is 28 μm or greater and 50 μm or less, for example, preferably 30 μm or greater and 45 μm or less, and more preferably 32 μm or greater and 43 μm or less.

The average thickness of the single layer type photosensitive layer in the second exemplary embodiment is 28 μm or greater and 50 μm or less, for example, preferably 30 μm or greater and 45 μm or less, and more preferably 32 μm or greater and 43 μm or less.

In a case where the average thickness of the photosensitive layer in the present exemplary embodiment is in the above-described ranges, the abrasion allowance of the photoreceptor is ensured and the life of the photoreceptor is extended as compared with a case where the average thickness thereof is less than the above-described range, and the electrical properties are likely to be maintained both in the initial stage and after abrasion as compared with a case where the average thickness thereof is greater than the above-described ranges.

Further, in the present exemplary embodiment, even in a case where the photosensitive layer is thick, since the photosensitive layer contains a polyester resin having an aromatic ring as a binder resin and the weight reduction ratio of the photosensitive layer is in the above-described ranges, both the abrasion resistance and the suppression of filming are achieved. From this viewpoint, the average thickness of the photosensitive layer may be 30 μm or greater, 35 μm or greater, 40 μm or greater, or 45 μm or greater.

In the present exemplary embodiment, in a case where the weight reduction ratio of the photosensitive layer is defined as W % by mass and the average thickness of the charge transport layer or the single layer type photosensitive layer is defined as T μm, the value of W×T is, for example, preferably 4.2 or less, more preferably 3.5 or less, and still more preferably 2.5 or less. Since the value of W×T is in the above-described ranges, initial filming is suppressed as compared with a case where the value is greater than the above-described ranges. The reason for this is not clear, but is assumed as follows.

In a step of drying a coating film of a coating solution for forming a photosensitive layer, volatile components in the coating film move to the surface of the coating film and volatilize. Therefore, since the volatile components are concentrated on the surface as the thickness of the coating film increases, a photosensitive layer in which a large number of volatile components are unevenly distributed on the surface is likely to be obtained. On the contrary, in a photoreceptor in which the value of W×T is in the above-described ranges, since the amount of volatile components unevenly distributed on the surface of the photosensitive layer is small, initial filming due to a large amount of volatile components unevenly distributed on the surface is assumed to be suppressed.

That is, in the present exemplary embodiment, even in a case where the photosensitive layer is thick, initial filming is suppressed in a case where the value of W×T is in the above-described ranges. The average thickness of the photosensitive layer in the present exemplary embodiment may be 30 μm or greater and the value of W×T may be in the above-described ranges, the average thickness thereof may be 35 μm or greater and the value of W×T may be in the above-described ranges, the average thickness thereof may be 40 μm or greater and the value of W×T may be in the above-described ranges, and the average thickness thereof may be 45 μm or greater and the value of W×T may be in the above-described ranges.

Polyester Resin

Hereinafter, the polyester resin contained in the photosensitive layer of the present exemplary embodiment as the binder resin will be described in detail.

The polyester resin is not particularly limited as long as the polyester resin has an aromatic ring.

Examples of the polyester resin having an aromatic ring include a polyester resin which has a dicarboxylic acid unit and a diol unit and in which at least one of the dicarboxylic acid unit or the diol unit has an aromatic ring. In the polyester resin, only the dicarboxylic acid unit may have an aromatic ring, only the diol unit may have an aromatic ring, and both the dicarboxylic acid unit and the diol unit may have an aromatic ring. From the viewpoint of the abrasion resistance of the photoreceptor, it is preferable that, for example, both the dicarboxylic acid unit and the diol unit of the polyester resin have an aromatic ring.

As the polyester resin having an aromatic ring, for example, a polyester resin (1) which has a dicarboxylic acid unit (A) represented by Formula (A) and a diol unit (B) represented by Formula (B) and in which at least one of the dicarboxylic acid unit (A) or the diol unit (B) has an aromatic ring is preferable.

Hereinafter, the polyester resin (1) having the following dicarboxylic acid unit (A) and the following diol unit (B) will be described in detail as an example of the polyester resin having an aromatic ring.

Polyester Resin (1)

The polyester resin (1) has at least a dicarboxylic acid unit (A) and a diol unit (B). The polyester resin (1) may have other dicarboxylic acid units in addition to the dicarboxylic acid unit (A). The polyester resin (1) may have other diol units in addition to the diol unit (B).

The dicarboxylic acid unit (A) is a constitutional unit represented by Formula (A).

Formula (A)

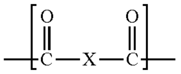

In Formula (A), X represents an organic group.

Examples of the organic group as X include an alkyl group, an aryl group, an aralkyl group, an alkoxy group, an aryloxy group, an ether group, a thioether group, and a combination of these groups.

It is preferable that the organic group as X has, for example, an aromatic ring.

Examples of the exemplary embodiment of the dicarboxylic acid unit (A) include a dicarboxylic acid unit (A') represented by Formula (A').

Formula (A')

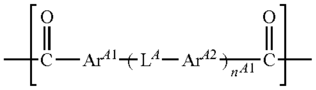

In Formula (A'), $Ar^{A1}$ and $Ar^{A2}$ each independently represent an aromatic ring that may have a substituent, $L^{A}$ represents a single bond or a divalent linking group, and $n^{A1}$ represents 0, 1, or 2.

The aromatic ring as $Ar^{A1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A1}$ may be substituted with an alkyl group, an aryl group, an aralkyl group, an alkoxy group, an aryloxy group, a halogen atom, or the like. As the substituent in a case where the aromatic ring as $Ar^{A1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring of $Ar^{A2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{A2}$ may be substituted with an alkyl group, an aryl group, an aralkyl group, an alkoxy group, an aryloxy group, a halogen atom, or the like. As the substituent in a case where the aromatic ring as $Ar^{A2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

In a case where $L^{A}$ represents a divalent linking group, examples of the divalent linking group include an oxygen atom, a sulfur atom, and $—C(Ra^1)(Ra^2)—$. Here, $Ra^1$ and $Ra^2$ each independently represent a hydrogen atom, an alkyl group having 1 or more and 10 or less carbon atoms, an aryl group having 6 or more and 12 or less carbon atoms, or an aralkyl group having 7 or more and 20 or less carbon atoms, and $Ra^1$ and $Ra^2$ may be bonded to each other to form a cyclic alkyl group.

The alkyl group having 1 or more and 10 or less carbon atoms as $Ra^1$ and $Ra^2$ may be any of linear, branched, or cyclic. The number of carbon atoms of the alkyl group is, for example, preferably 1 or more and 6 or less, more preferably 1 or more and 4 or less, and still more preferably 1 or 2.

The aryl group having 6 or more and 12 or less carbon atoms as $Ra^1$ and $Ra^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ra^1$ and $Ra^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Ra^1$ and $Ra^2$ may be any of a monocycle or a polycycle. The number of carbon atoms of the aryl group is, for example, preferably 6 or more and 10 or less and more preferably 6.

It is preferable that the dicarboxylic acid unit (A) includes, for example, at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented by Formula (A4).

Formula (A1)

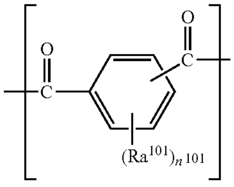

In Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{101}$ represents, for example, preferably 0, 1, or 2, more preferably 0 or 1, and still more preferably 0.

Formula (A2)

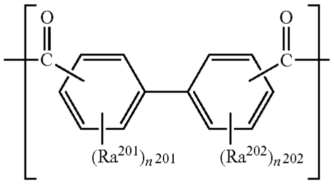

In Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{201}$ represents, for example, preferably 0, 1, or 2, more preferably 0 or 1, and still more preferably 0.

$n^{202}$ represents, for example, preferably 0, 1, or 2, more preferably 0 or 1, and still more preferably 0.

Formula (A3)

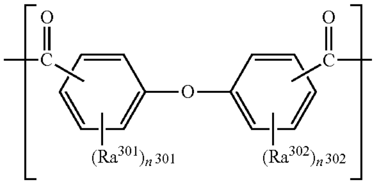

In Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{301}$ represents, for example, preferably 0, 1, or 2, more preferably 0 or 1, and still more preferably 0.

$n^{302}$ represents, for example, preferably 0, 1, or 2, more preferably 0 or 1, and still more preferably 0.

Formula (A4)

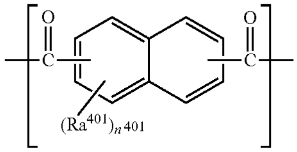

In Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

$n^{401}$ represents, for example, preferably an integer of 0 or greater and 4 or less, more preferably 0, 1, or 2, and still more preferably 0.

The specific forms and the preferable forms of $Ra^{101}$ in Formula (A1), $Ra^{201}$ and $Ra^{202}$ in Formula (A2), $Ra^{301}$ and $Ra^{302}$ in Formula (A3), and $Ra^{401}$ in Formula (A4) are the same as each other, and hereinafter, $Ra^{101}$, $Ra^{201}$, $Ra^{202}$, $Ra^{301}$, $Ra^{302}$, and $Ra^{401}$ will be collectively referred to as "Ra".

The alkyl group having 1 or more and 10 or less carbon atoms as Ra may be any of linear, branched, or cyclic. The number of carbon atoms of the alkyl group is, for example, preferably 1 or more and 6 or less, more preferably 1 or more and 4 or less, and still more preferably 1 or 2.

Examples of the linear alkyl group having 1 or more and 10 or less carbon atoms include a methyl group, an ethyl group, an n-propyl group, an n-butyl group, an n-pentyl group, an n-hexyl group, an n-heptyl group, an n-octyl group, an n-nonyl group, and an n-decyl group.

Examples of the branched alkyl group having 3 or more and 10 or less carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, and a tert-decyl group.

Examples of the cyclic alkyl group having 3 or more and 10 or less carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic (for example, bicyclic, tricyclic, or spirocyclic) alkyl groups to which these monocyclic alkyl groups are linked.

The aryl group having 6 or more and 12 or less carbon atoms as Ra may be any of a monocycle or a polycycle. The number of carbon atoms of the aryl group is, for example, preferably 6 or more and 10 or less and more preferably 6.

Examples of the aryl group having 6 or more and 12 or less carbon atoms include a phenyl group, a biphenyl group, a 1-naphthyl group, and a 2-naphthyl group.

The alkyl group in the alkoxy group having 1 or more and 6 or less carbon atoms as Ra may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Hereinafter, dicarboxylic acid units (A1-1) to (A1-9) are shown as specific examples of the dicarboxylic acid unit (A1). The dicarboxylic acid unit (A1) is not limited thereto.

(A1-1)

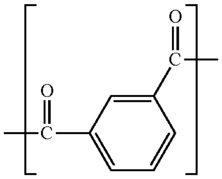

(A1-2)

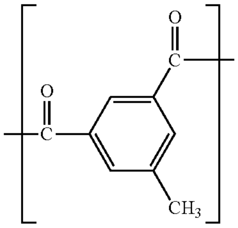

(A1-3)

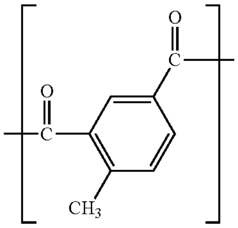

(A1-4)

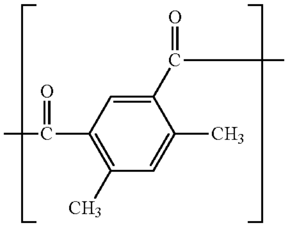

(A1-5)

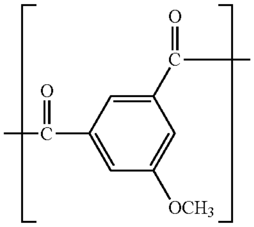

-continued (A1-6)

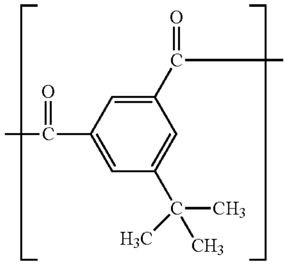

(A1-7)

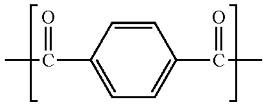

(A1-8)

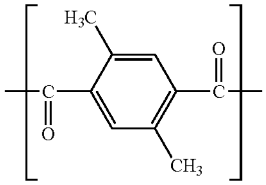

(A1-9)

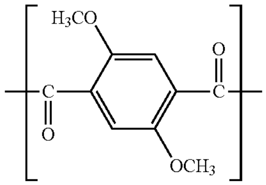

Hereinafter, dicarboxylic acid units (A2-1) to (A2-3) are shown as specific examples of the dicarboxylic acid unit (A2). The dicarboxylic acid unit (A2) is not limited thereto.

(A2-1)

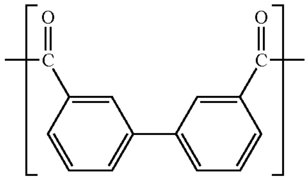

(A2-2)

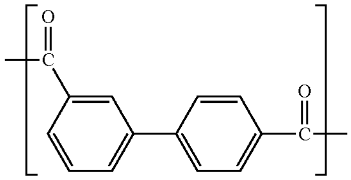

(A2-3)

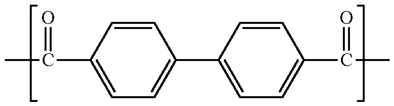

Hereinafter, dicarboxylic acid units (A3-1) and (A3-2) are shown as specific examples of the dicarboxylic acid unit (A3). The dicarboxylic acid unit (A3) is not limited thereto.

(A3-1)

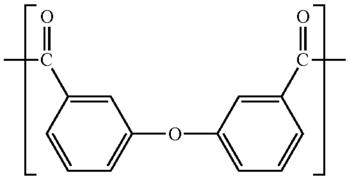

(A3-2)

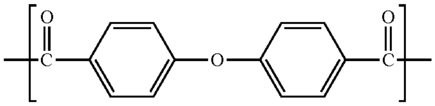

Hereinafter, dicarboxylic acid units (A4-1) to (A4-3) are shown as specific examples of the dicarboxylic acid unit (A4). The dicarboxylic acid unit (A4) is not limited thereto.

(A4-1)

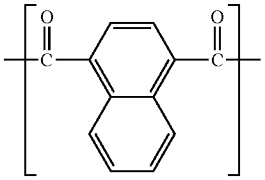

(A4-2)

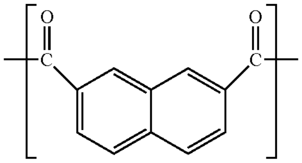

(A4-3)

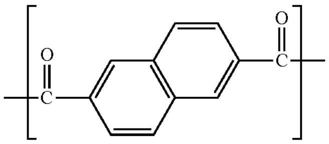

As the dicarboxylic acid unit (A), for example, (A1-1), (A1-7), (A2-3), (A3-2), and (A4-3) in the specific examples shown above are preferable, and (A2-3) is most preferable.

The total mass proportion of the dicarboxylic acid units (A1) to (A4) in the polyester resin (1) is, for example, preferably 15% by mass or greater and 60% by mass or less.

In a case where the total mass proportion of the dicarboxylic acid units (A1) to (A4) is 15% by mass or greater, the abrasion resistance of the photosensitive layer is enhanced. From this viewpoint, the total mass proportion of the dicarboxylic acid units (A1) to (A4) is, for example, more preferably 20% by mass or greater and still more preferably 25% by mass or greater.

In a case where the total mass proportion of the dicarboxylic acid units (A1) to (A4) is 60% by mass or less, peeling of the photosensitive layer can be suppressed. From this viewpoint, the total mass proportion of the dicarboxylic acid units (A1) to (A4) is, for example, more preferably 55% by mass or less and still more preferably 50% by mass or less.

The dicarboxylic acid units (A1) to (A4) contained in the polyester resin (1) may be used alone or in combination of two or more kinds thereof.

Examples of other dicarboxylic acid units (A) in addition to the dicarboxylic acid units (A1) to (A4) include aliphatic dicarboxylic acid (such as oxalic acid, malonic acid, maleic acid, fumaric acid, citraconic acid, itaconic acid, glutaconic acid, succinic acid, alkenyl succinic acid, adipic acid, and sebacic acid) units, alicyclic dicarboxylic acid (such as cyclohexanedicarboxylic acid) units, and lower (for example, having 1 or more and 5 or less carbon atoms) alkyl ester units thereof. These dicarboxylic acid units contained in the polyester resin (1) may be used alone or in combination of two or more kinds thereof.

The dicarboxylic acid unit (A) contained in the polyester resin (1) may be used alone or in combination of two or more kinds thereof.

The diol unit (B) is a constitutional unit represented by Formula (B).

Formula (B)

$$-\!\!\left[O-Ar^{B1}\!\left(L^{B}-Ar^{B2}\right)_{n^{B1}}O\right]\!\!-$$

In Formula (B), $Ar^{B1}$ and $Ar^{B2}$ each independently represent an aromatic ring that may have a substituent, $L^B$ represents a single bond, an oxygen atom, a sulfur atom, or $—C(Rb^1)(Rb^2)—$, and $n^{B1}$ represents 0, 1, or 2. $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

The aromatic ring as $Ar^{B1}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B1}$ may be substituted with an alkyl group, an aryl group, an aralkyl group, an alkoxy group, an aryloxy group, a halogen atom, or the like. As the substituent in a case where the aromatic ring as $Ar^{B1}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The aromatic ring as $Ar^{B2}$ may be any of a monocycle or a polycycle. Examples of the aromatic ring include a benzene ring, a naphthalene ring, an anthracene ring, and a phenanthrene ring. Among these, for example, a benzene ring and a naphthalene ring are preferable.

The hydrogen atom on the aromatic ring as $Ar^{B2}$ may be substituted with an alkyl group, an aryl group, an aralkyl group, an alkoxy group, an aryloxy group, a halogen atom, or the like. As the substituent in a case where the aromatic ring as $Ar^{B2}$ is substituted, for example, an alkyl group having 1 or more and 10 or less carbon atoms, an aryl group having 6 or more and 12 or less carbon atoms, and an alkoxy group having 1 or more and 6 or less carbon atoms are preferable.

The alkyl group having 1 or more and 20 or less carbon atoms as $Rb^1$ and $Rb^2$ may be any of linear, branched, or cyclic. The number of carbon atoms of the alkyl group is, for example, preferably 1 or more and 18 or less, more preferably 1 or more and 14 or less, and still more preferably 1 or more and 10 or less.

The aryl group having 6 or more and 12 or less carbon atoms as $Rb^1$ and $Rb^2$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Rb^1$ and $Rb^2$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2.

The aryl group in the aralkyl group having 7 or more and 20 or less carbon atoms as $Rb^1$ and $Rb^2$ may be any of a monocycle or a polycycle. The number of carbon atoms of the aryl group is, for example, preferably 6 or more and 10 or less and more preferably 6.

It is preferable that the diol unit (B) includes, for example, at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

The diol unit (B) includes, for example, more preferably at least one selected from the group consisting of a diol unit (B1) represented by Formula (B1), a diol unit (B2) represented by Formula (B2), a diol unit (B4) represented by Formula (B4), a diol unit (B5) represented by Formula (B5), and a diol unit (B6) represented by Formula (B6), still more preferably at least one selected from the group consisting of a diol unit (B1) represented by Formula (B1), a diol unit (B2) represented by Formula (B2), a diol unit (B5) represented by Formula (B5), and a diol unit (B6) represented by Formula (B6), even still more preferably at least one selected from the group consisting of a diol unit (B1) represented by Formula (B1), a diol unit (B2) represented by Formula (B2), and a diol unit (B6) represented by Formula (B6), and most preferably at least one selected from the group consisting of a diol unit (B1) represented by Formula (B1) and a diol unit (B2) represented by Formula (B2).

Formula (B1)

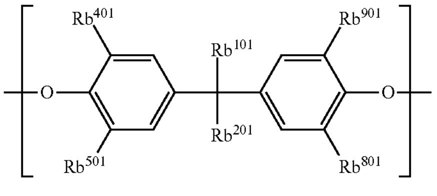

In Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

The number of carbon atoms of the branched alkyl group having 4 or more and 20 or less carbon atoms as $Rb^{101}$ is, for example, preferably 4 or more and 16 or less, more preferably 4 or more and 12 or less, and still more preferably 4 or more and 8 or less. Specific examples of $Rb^{101}$ include an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Formula (B2)

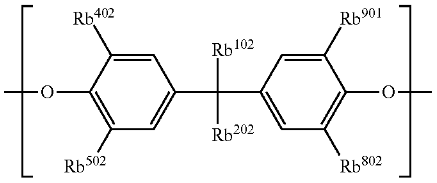

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 4 or more and 20 or less carbon atoms as $Rb^{102}$ is, for example, preferably 4 or more and 16 or less, more preferably 4 or more and 12 or less, and still more preferably 4 or more and 8 or less. Specific examples of $Rb^{102}$ include an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Formula (B3)

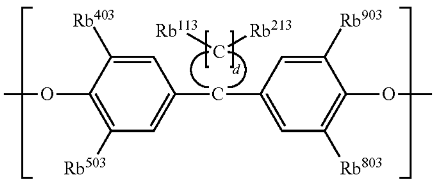

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{113}$ and $Rb^{213}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{113}$ and $Rb^{213}$ may be any of linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{113}$ and $Rb^{213}$ include a fluorine atom, a chlorine atom, a bromine atom, and an iodine atom.

Formula (B4)

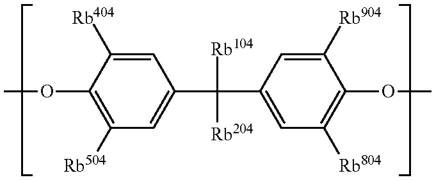

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

The alkyl group having 1 or more and 3 or less carbon atoms as $Rb^{104}$ may be any of linear, branched, or cyclic. The number of carbon atoms of the alkyl group is, for example, preferably 1 or 2 and more preferably 1. Specific examples of $Rb^{104}$ include a methyl group, an ethyl group, an n-propyl group, an isopropyl group, and a cyclopropyl group.

Formula (B5)

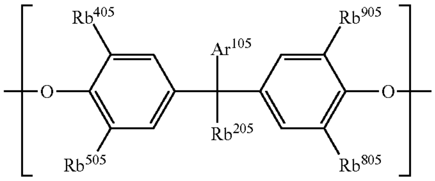

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

The aryl group having 6 or more and 12 or less carbon atoms as $Ar^{105}$ may be any of a monocycle or a polycycle. The number of carbon atoms of the aryl group is, for example, preferably 6 or more and 10 or less and more preferably 6.

The alkyl group in the aralkyl group having 7 or more and 20 or less carbon atoms as $Ar^{105}$ may be any of linear, branched, or cyclic. The number of carbon atoms of the alkyl group in the aralkyl group having 7 or more and 20 or less carbon atoms is, for example, preferably 1 or more and 4 or less, more preferably 1 or more and 3 or less, and still more preferably 1 or 2. The aryl group in the aralkyl group having 7 or more and 20 or less carbon atoms as $Ar^{105}$ may be any of a monocycle or a polycycle. The number of carbon atoms of the aryl group is, for example, preferably 6 or more and 10 or less and more preferably 6. Examples of the aralkyl group having 7 or more and 20 or less carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthracenylmethyl group, and a phenyl-cyclopentylmethyl group.

Formula (B6)

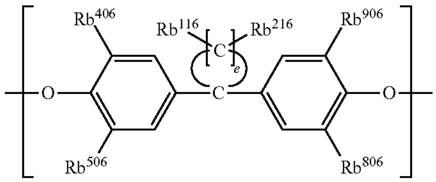

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

The number of carbon atoms of the linear alkyl group having 1 or more and 3 or less carbon atoms as $Rb^{116}$ and $Rb^{216}$ is, for example, preferably 1 or 2 and more preferably 1. Specific examples of such a group include a methyl group, an ethyl group, and an n-propyl group.

The alkyl group in the alkoxy group having 1 or more and 4 or less carbon atoms as $Rb^{116}$ and $Rb^{216}$ may be any of linear, branched, or cyclic. The number of carbon atoms of the alkyl group in the alkoxy group having 1 or more and 4 or less carbon atoms is, for example, preferably 1 or more and 3 or less, more preferably 1 or 2, and still more preferably 1. Specific examples of such a group include a methoxy group, an ethoxy group, an n-propoxy group, an n-butoxy group, an isopropoxy group, an isobutoxy group, a sec-butoxy group, a tert-butoxy group, a cyclopropoxy group, and a cyclobutoxy group.

Examples of the halogen atom as $Rb^{116}$ and $Rb^{216}$ include a fluorine atom, a chlorine atom, a bromine atom, and an iodine atom.

Formula (B7)

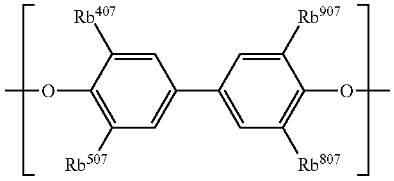

In Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

Formula (B8)

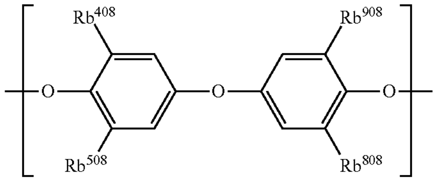

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

The specific forms and the preferable forms of $Rb^{201}$ in Formula (B1), $Rb^{202}$ in Formula (B2), $Rb^{204}$ in Formula (B4), and $Rb^{205}$ in Formula (B5) are the same as each other, and hereinafter, $Rb^{201}$, $Rb^{202}$, $Rb^{204}$, and $Rb^{205}$ will be collectively referred to as "$Rb^{200}$".

The alkyl group having 1 or more and 3 or less carbon atoms as $Rb^{200}$ may be any of linear, branched, or cyclic. The number of carbon atoms of the alkyl group is, for example, preferably 1 or 2 and more preferably 1.

The alkyl group having 1 or more and 3 or less carbon atoms includes a methyl group, an ethyl group, an n-propyl group, an isopropyl group, and a cyclopropyl group.

The specific forms and the preferable forms of $Rb^{401}$ in Formula (B1), $Rb^{402}$ in Formula (B2), $Rb^{403}$ in Formula (B3), $Rb^{404}$ in Formula (B4), $Rb^{405}$ in Formula (B5), $Rb^{406}$ in Formula (B6), $Rb^{407}$ in Formula (B7), and $Rb^{408}$ in Formula (B8) are the same as each other, and hereinafter, $Rb^{401}$, $Rb^{402}$, $Rb^{403}$, $Rb^{404}$, $Rb^{405}$, $Rb^{406}$, $Rb^{407}$, and $Rb^{408}$ will be collectively referred to as "$Rb^{400}$".

The alkyl group having 1 or more and 4 or less carbon atoms as $Rb^{400}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{400}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{400}$ include a fluorine atom, a chlorine atom, a bromine atom, and an iodine atom.

The specific forms and the preferable forms of $Rb^{501}$ in Formula (B1), $Rb^{502}$ in Formula (B2), $Rb^{503}$ in Formula (B3), $Rb^{504}$ in Formula (B4), $Rb^{505}$ in Formula (B5), $Rb^{506}$ in Formula (B6), $Rb^{507}$ in Formula (B7), and $Rb^{508}$ in Formula (B8) are the same as each other, and hereinafter, $Rb^{501}$, $Rb^{502}$, $Rb^{503}$, $Rb^{504}$, $Rb^{505}$, $Rb^{506}$, $Rb^{507}$, and $Rb^{508}$ will be collectively referred to as "$Rb^{500}$".

The alkyl group having 1 or more and 4 or less carbon atoms as $Rb^{500}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{500}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{500}$ include a fluorine atom, a chlorine atom, a bromine atom, and an iodine atom.

The specific forms and the preferable forms of $Rb^{801}$ in Formula (B1), $Rb^{802}$ in Formula (B2), $Rb^{803}$ in Formula (B3), $Rb^{804}$ in Formula (B4), $Rb^{805}$ in Formula (B5), $Rb^{806}$ in Formula (B6), $Rb^{807}$ in Formula (B7), and $Rb^{808}$ in Formula (B8) are the same as each other, and hereinafter, $Rb^{801}$, $Rb^{802}$, $Rb^{803}$, $Rb^{804}$, $Rb^{805}$, $Rb^{806}$, $Rb^{807}$, and $Rb^{808}$ will be collectively referred to as "$Rb^{800}$".

The alkyl group having 1 or more and 4 or less carbon atoms as $Rb^{800}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{800}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{800}$ include a fluorine atom, a chlorine atom, a bromine atom, and an iodine atom.

The specific forms and the preferable forms of $Rb^{901}$ in Formula (B1), $Rb^{902}$ in Formula (B2), $Rb^{903}$ in Formula (B3), $Rb^{904}$ in Formula (B4), $Rb^{905}$ in Formula (B5), $Rb^{906}$ in Formula (B6), $Rb^{907}$ in Formula (B7), and $Rb^{908}$ in Formula (B8) are the same as each other, and hereinafter, $Rb^{901}$, $Rb^{902}$, $Rb^{903}$, $Rb^{904}$, $Rb^{905}$, $Rb^{906}$, $Rb^{907}$, and $Rb^{908}$ will be collectively referred to as "$Rb^{900}$".

The alkyl group having 1 or more and 4 or less carbon atoms as $Rb^{900}$ may be any of linear, branched, or cyclic. The number of carbon atoms of the alkyl group is, for example, preferably 1 or more and 3 or less, more preferably 1 or 2, and still more preferably 1.

Examples of the linear alkyl group having 1 or more and 4 or less carbon atoms include a methyl group, an ethyl group, an n-propyl group, and an n-butyl group.

Examples of the branched alkyl group having 3 or 4 carbon atoms include an isopropyl group, an isobutyl group, a sec-butyl group, and a tert-butyl group.

Examples of the cyclic alkyl group having 3 or 4 carbon atoms include a cyclopropyl group and a cyclobutyl group.

The alkyl group in the alkoxy group having 1 or more and 6 or less carbon atoms as $Rb^{900}$ may be any of linear, branched, or cyclic. The number of carbon atoms of the alkyl group in the alkoxy group having 1 or more and 6 or less carbon atoms is, for example, preferably 1 or more and 4 or less, more preferably 1 or more and 3 or less, and still more preferably 1 or 2.

Examples of the linear alkoxy group having 1 or more and 6 or less carbon atoms include a methoxy group, an ethoxy group, an n-propoxy group, an n-butoxy group, an n-pentyloxy group, and an n-hexyloxy group.

Examples of the branched alkoxy group having 3 or more and 6 or less carbon atoms include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, and a tert-hexyloxy group.

Examples of the cyclic alkoxy group having 3 or more and 6 or less carbon atoms include a cyclopropoxy group, a cyclobutoxy group, a cyclopentyloxy group, and a cyclohexyloxy group.

Examples of the halogen atom as $Rb^{900}$ include a fluorine atom, a chlorine atom, a bromine atom, and an iodine atom.

Hereinafter, diol units (B1-1) to (B1-6) are shown as specific examples of the diol unit (B1). The diol unit (B1) is not limited thereto.

(B1-1)

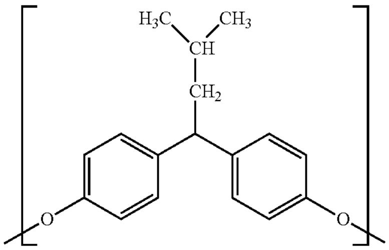

(B1-2)

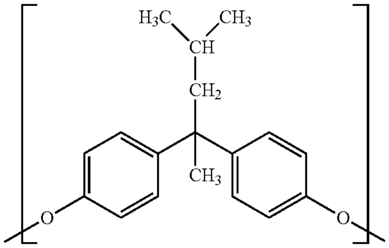

(B1-3)

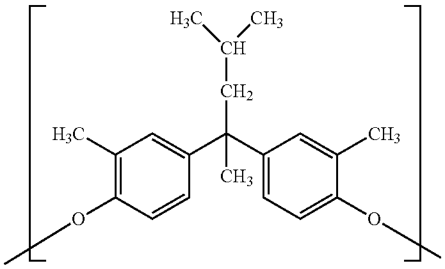

(B1-4)

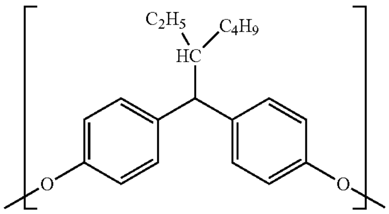

(B1-5)

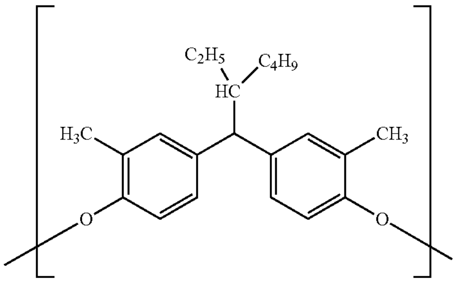

-continued (B1-6)

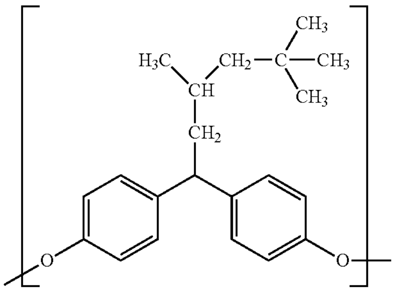

Hereinafter, diol units (B2-1) to (B2-11) are shown as specific examples of the diol unit (B2). The diol unit (B2) is not limited thereto.

(B2-1)

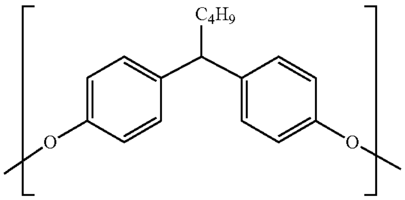

(B2-2)

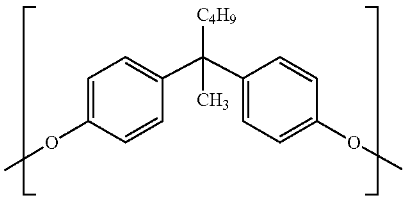

(B2-3)

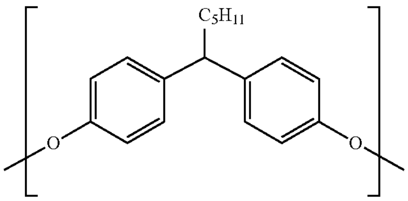

(B2-4)

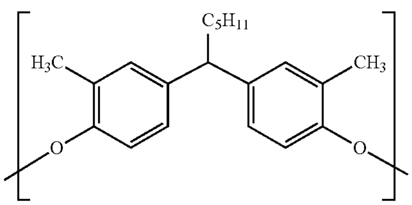

(B2-5)

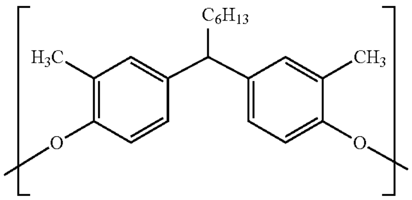

-continued
(B2-6)
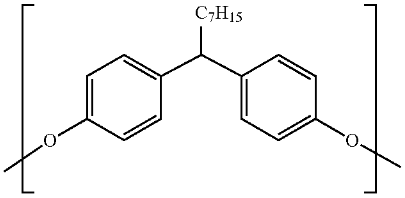
(B2-7)
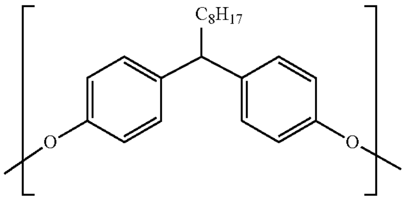
(B2-8)
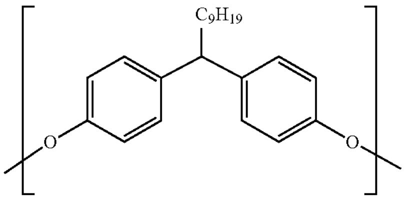
(B2-9)
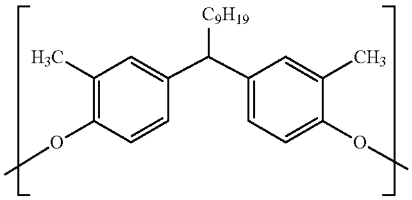
(B2-10)
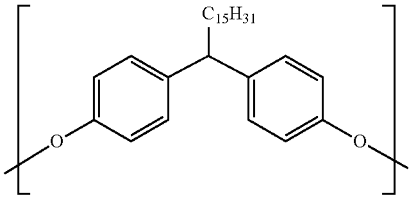
(B2-11)
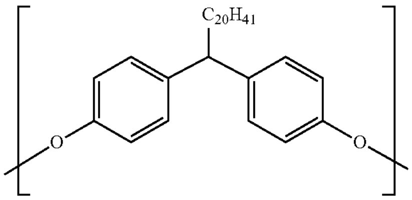
Hereinafter, diol units (B3-1) to (B3-4) are shown as specific examples of the diol unit (B3). The diol unit (B3) is not limited thereto.
(B3-1)
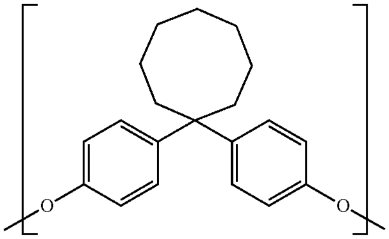
(B3-2)
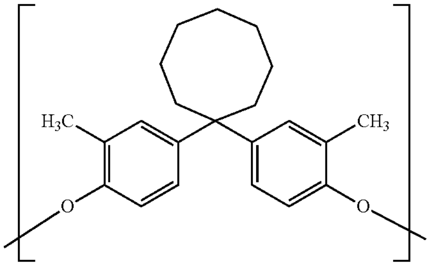
(B3-3)
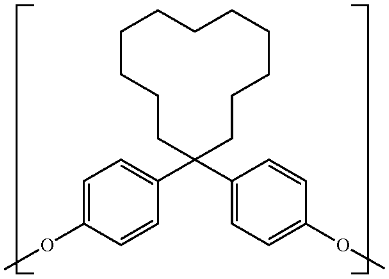
(B3-4)
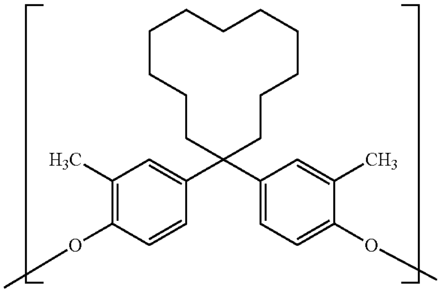
Hereinafter, diol units (B4-1) to (B4-7) are shown as specific examples of the diol unit (B4). The diol unit (B4) is not limited thereto.
(B4-1)
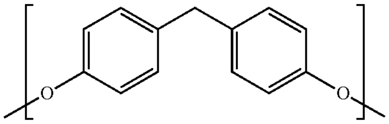
(B4-2)
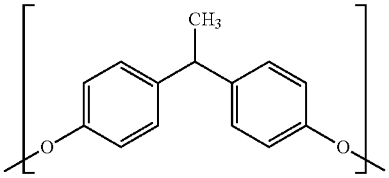

-continued
(B4-3)
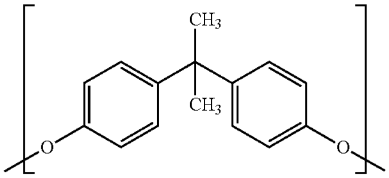
(B4-4)
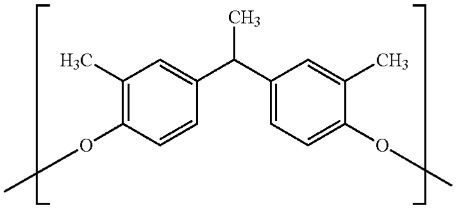
(B4-5)
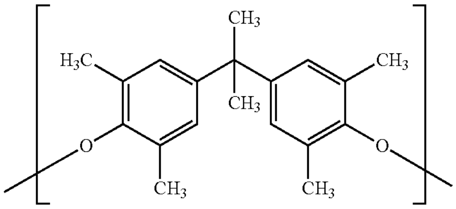
(B4-6)
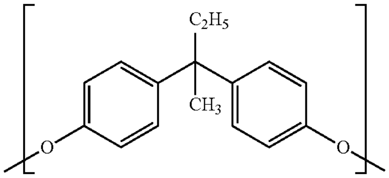
(B4-7)
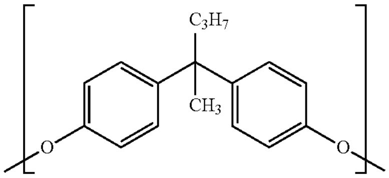
Hereinafter, diol units (B5-1) to (B5-6) are shown as specific examples of the diol unit (B5). The diol unit (B5) is not limited thereto.
(B5-1)
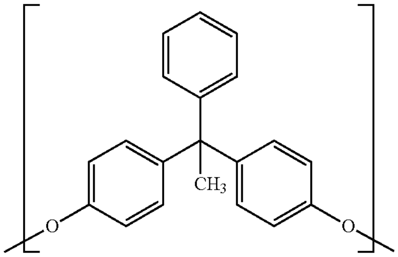
-continued
(B5-2)
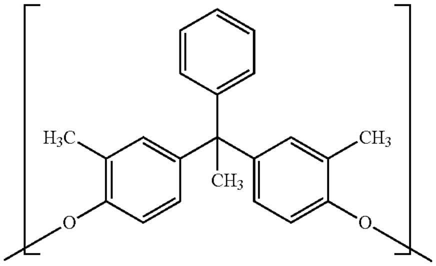
(B5-3)
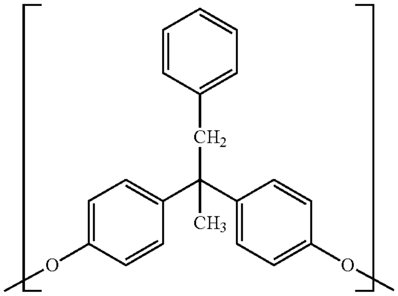
(B5-4)
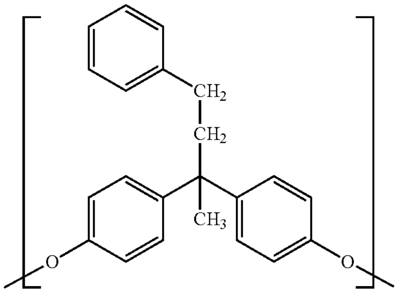
(B5-5)
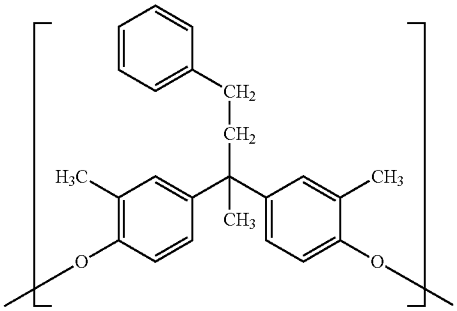
(B5-6)
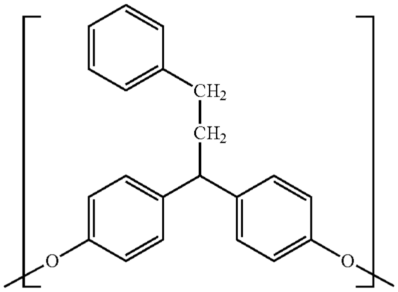
Hereinafter, diol units (B6-1) to (B6-4) are shown as specific examples of the diol unit (B6). The diol unit (B6) is not limited thereto.

(B6-1)

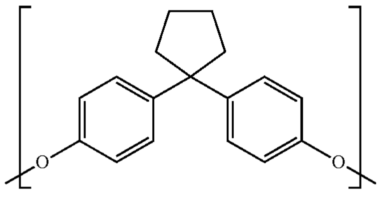

(B6-2)

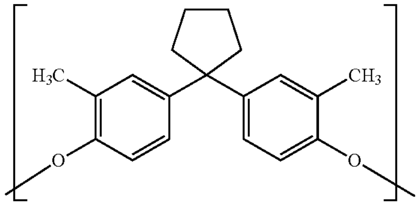

(B6-3)

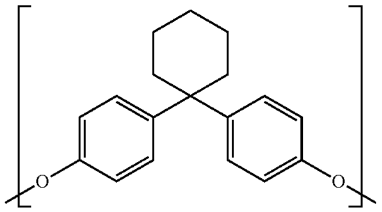

(B6-4)

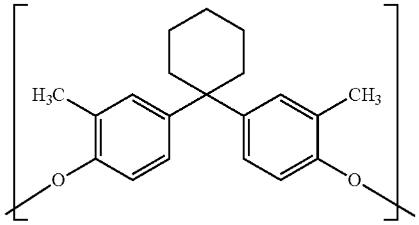

Hereinafter, diol units (B7-1) to (B7-3) are shown as specific examples of the diol unit (B7). The diol unit (B7) is not limited thereto.

(B7-1)

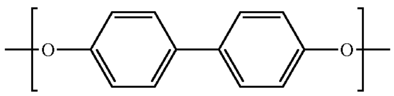

(B7-2)

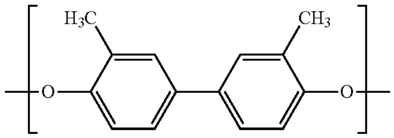

-continued (B7-3)

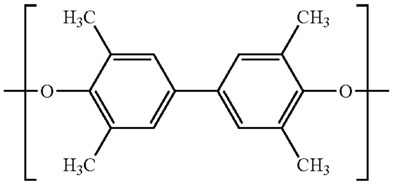

Hereinafter, diol units (B8-1) to (B8-3) are shown as specific examples of the diol unit (B8). The diol unit (B8) is not limited thereto.

(B8-1)

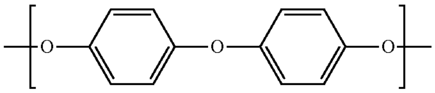

(B8-2)

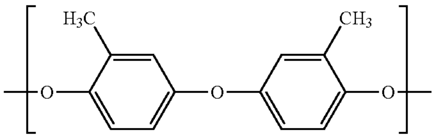

(B8-3)

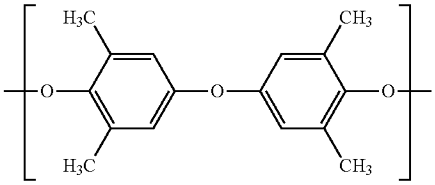

The diol unit (B) contained in the polyester resin (1) may be used alone or in combination of two or more kinds thereof.

The mass proportion of the diol unit (B) in the polyester resin (1) is, for example, preferably 25% by mass or greater and 80% by mass or less.

In a case where the mass proportion of the diol unit (B) is 25% by mass or greater, peeling of the photosensitive layer can be further suppressed. From this viewpoint, the mass proportion of the diol unit (B) is, for example, more preferably 30% by mass or greater and still more preferably 35% by mass or greater.

In a case where the mass proportion of the diol unit (B) is 80% by mass or less, the solubility in a coating solution for forming the photosensitive layer is maintained, and thus the abrasion resistance can be improved. From this viewpoint, the mass proportion of the diol unit (B) is, for example, more preferably 75% by mass or less and still more preferably 70% by mass or less.

Examples of other diol units in addition to the diol unit (B) include aliphatic diol (such as ethylene glycol, diethylene glycol, triethylene glycol, propylene glycol, butanediol, hexanediol, and neopentyl glycol) units and alicyclic diol (such as cyclohexanediol, cyclohexane dimethanol, and hydrogenated bisphenol A) units. These diol units contained in the polyester resin (1) may be used alone or in combination of two or more kinds thereof.

A terminal of the polyester resin (1) may be sealed or modified with a terminal-sealing agent, a molecular weight modifier, or the like used in a case of the production. Examples of the terminal-sealing agent or the molecular weight modifier include monohydric phenol, monovalent acid chloride, monohydric alcohol, and monovalent carboxylic acid.

Examples of the monohydric phenol include phenol, o-cresol, m-cresol, p-cresol, o-ethylphenol, m-ethylphenol, p-ethylphenol, o-propylphenol, m-propylphenol, p-propylphenol, o-tert-butylphenol, m-tert-butylphenol, p-tert-butylphenol, pentylphenol, hexylphenol, octylphenol, nonylphenol, a 2,6-dimethylphenol derivative, a 2-methylphenol derivative, o-phenylphenol, m-phenylphenol, p-phenylphenol, o-methoxyphenol, m-methoxyphenol, p-methoxyphenol, 2,3,5-trimethylphenol, 2,3,6-trimethylphenol, 2,3-xylenol, 2,4-xylenol, 2,5-xylenol, 2,6-xylenol, 3,4-xylenol, 3,5-xylenol, 2-phenyl-2-(4-hydroxyphenyl) propane, 2-phenyl-2-(2-hydroxyphenyl)propane, and 2-phenyl-2-(3-hydroxyphenyl)propane.

Examples of the monovalent acid chloride include monofunctional acid halides such as benzoyl chloride, benzoic acid chloride, methanesulfonyl chloride, phenylchloroformate, acetic acid chloride, butyric acid chloride, octyl acid chloride, benzenesulfonyl chloride, benzenesulfinyl chloride, sulfinyl chloride, benzene phosphonyl chloride, and substituents thereof.

Examples of the monohydric alcohol include methanol, ethanol, n-propanol, isopropanol, n-butanol, 2-butanol, pentanol, hexanol, dodecyl alcohol, stearyl alcohol, benzyl alcohol, and phenethyl alcohol.

Examples of the monovalent carboxylic acid include acetic acid, propionic acid, octanoic acid, cyclohexanecarboxylic acid, benzoic acid, toluic acid, phenylacetic acid, p-tert-butylbenzoic acid, and p-methoxyphenylacetic acid.

The weight-average molecular weight of the polyester resin (1) is, for example, preferably 30,000 or greater and 300,000 or less, more preferably 40,000 or greater and 250,000 or less, and still more preferably 50,000 or greater and 200,000 or less.

The molecular weight of the polyester resin (1) is a molecular weight measured by gel permeation chromatography (GPC) in terms of polystyrene. The GPC is carried out by using tetrahydrofuran as an eluent.

Examples of the method of producing the polyester resin (1) include an interfacial polymerization method, a solution polymerization method, and a melt polymerization method.

Hereinafter, each layer of the electrophotographic photoreceptor according to the first exemplary embodiment and the second exemplary embodiment will be described in detail. Further, the reference numerals will not be provided.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. Further, in a case where incoherent light is used as a light source, roughening of the surface to prevent interference fringes is not particularly necessary, and roughening of the surface to prevent interference fringes is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the micropores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C.

or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $10^2$ Ωcm or greater and $10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2/g$ or greater.

The volume average particle diameter of the inorganic particles may be, for example, 50 nm or greater and 2,000 nm or less (for example, preferably 60 nm or greater and 1000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

Further, the electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic acid anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to 1/2 from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The film thickness of the undercoat layer is set to, for example, preferably 15 μm or greater and more preferably 20 μm or greater and 50 μm or less.

Interlayer

Although not shown in the figures, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic acid anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is preferable in a case where an incoherent light source, for example, a light emitting diode (LED) or an organic electroluminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term “insulating” denotes that the volume resistivity is $10^{13}$ Ωcm or greater.

These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof.

As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a micro-flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, in a range of preferably 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

As the polymer charge transport material, known materials having charge transport properties, such as poly-N-vinylcarbazole and polysilane, can be used. For example, a polyester-based polymer charge transport material is particularly preferable. Further, the polymer charge transport material may be used alone or in combination of binder resins.

Examples of the charge transport material or the polymer charge transport material include a polycyclic aromatic compound, an aromatic nitro compound, an aromatic amine compound, a heterocyclic compound, a hydrazone compound, a styryl compound, an enamine compound, a benzidine compound, a triarylamine compound (particularly, a triphenylamine compound), a diamine compound, an oxadiazole compound, a carbazole compound, an organic polysilane compound, a pyrazoline compound, an indole compound, an oxazole compound, an isoxazole compound, a thiazole compound, a thiadiazole compound, an imidazole compound, a pyrazole compound, a triazole compound, a cyano compound, a benzofuran compound, an aniline compound, a butadiene compound, and a resin containing a group derived from any of these substances. Specific examples thereof include compounds described in paragraphs 0078 to 0080 of JP2021-117377A, paragraphs 0046 to 0048 of JP2019-035900A, paragraphs 0052 and 0053 of JP2019-012141A, paragraphs 0122 to 0134 of JP2021-071565A, paragraphs 0101 to 0110 of JP2021-015223A, paragraph 0116 of JP2013-097300A, paragraphs 0309 to 0316 of WO2019/070003A, paragraphs 0103 to 0107 of JP2018-159087A, and paragraphs 0102 to 0113 of JP2021-148818A.

From the viewpoint of the charge mobility, it is preferable that the charge transport material contains, for example, at least one selected from the group consisting of a compound (D1) represented by Formula (D1), a compound (D2) represented by Formula (D2), a compound (D3) represented by Formula (D3), and a compound (D4) represented by Formula (D4).

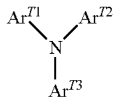

Formula (D1)

In Formula (D1), $Ar^{T1}$, $Ar^{T2}$, and $Ar^{T3}$ each independently represent an aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, an alkyl group, or an aryl group. In a case where $R^{T5}$ and $R^{T6}$ represent an aryl group, the aryl groups may be linked to each other via at least one divalent group selected from the group consisting of $-C(R^{51})(R^{52})-$ and $-C(R^{61})C(R^{62})-$. $R^{51}$, $R^{52}$, $R^{61}$, and $R^{62}$ each independently represent a hydrogen atom or an alkyl group having 1 or more and 3 or less carbon atoms.

The group in Formula (D1) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the compound (D1), for example, a compound containing at least one of an aryl group or $-C_6H_4-CH=CH-CH=C(R^{T7})(R^{T8})$ is preferable, and a compound (D'1) represented by Formula (D'1) is more preferable.

Formula (D'1)

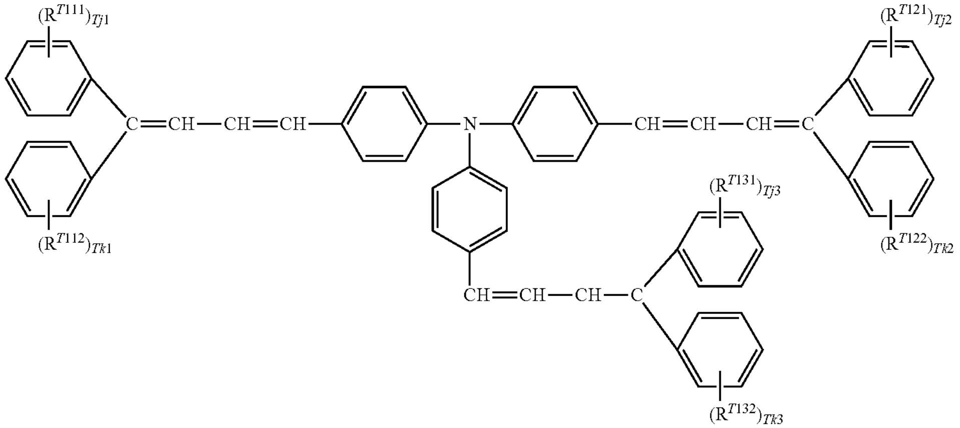

In Formula (D'1), $R^{T111}$, $R^{T112}$, $R^{T121}$, $R^{T122}$, $R^{T131}$, and $R^{T132}$ each independently represent a hydrogen atom, a halogen atom, an alkyl group (for example, preferably an alkyl group having 1 or more and 3 or less carbon atoms), an alkoxy group (for example, preferably an alkoxy group having 1 or more and 3 or less carbon atoms), a phenyl group, or a phenoxy group. Tj1, Tj2, Tj3, Tk1, Tk2, and Tk3 each independently represent 0, 1, or 2.

Formula (D2)

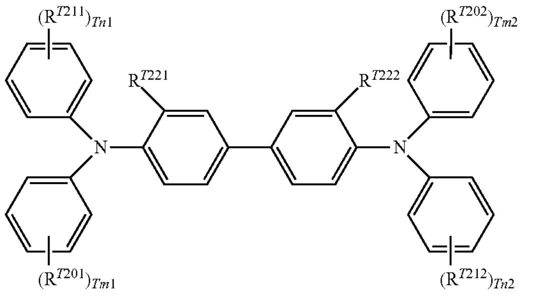

—CH═CH—CH═C($R^{T24}$)($R^{T25}$). $R^{T21}$, $R^{T22}$, $R^{T23}$, $R^{T24}$, and $R^{T25}$ each independently represent a hydrogen atom, an alkyl group, or an aryl group. $R^{T221}$ and $R^{T222}$ each independently represent a hydrogen atom, a halogen atom, an alkyl group having 1 or more and 5 or less carbon atoms, or an alkoxy group having 1 or more and 5 or less carbon atoms. Tm1, Tm2, Tn1, and Tn2 each independently represent 0, 1, or 2.

The group in Formula (D2) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

From the viewpoint of the charge mobility, as the compound (D2), for example, a compound containing at least one of an alkyl group, an aryl group, or —CH═CH—CH═C($R^{T24}$)($R^{T25}$) is preferable, and a compound containing two of an alkyl group, an aryl group, or —CH═CH—CH═C($R^{T24}$)($R^{T25}$) is more preferable.

Formula (D3)

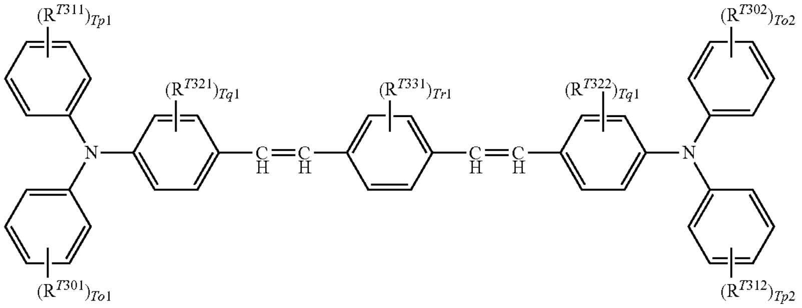

In Formula (D2), $R^{T201}$, $R^{T02}$, $R^{T211}$, and $R^{T212}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, —C($R^{T21}$)═C($R^{T22}$)($R^{T23}$), or In Formula (D3), $R^{T301}$, $R^{T302}$, $R^{T311}$, and $R^{T312}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, —C($R^{T31}$)═C($R^{T32}$)($R^{T33}$), or $—CH{=}CH—CH{=}C(R^{T34})(R^{T35})$. $R^{T31}$, $R^{T32}$, $R^{T33}$, $R^{T34}$, and $R^{T35}$ each independently represent a hydrogen atom, an alkyl group, or an aryl group. $R^{T321}$, $R^{T322}$, and $R^{T331}$ each independently represent a hydrogen atom, a halogen atom, an alkyl group having 1 or more and 5 or less carbon atoms, or an alkoxy group having 1 or more and 5 or less carbon atoms. To1, To2, Tp1, Tp2, Tq1, Tq2, and Tr1 each independently represent 0, 1, or 2.

The group in Formula (D3) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

Formula (D4)

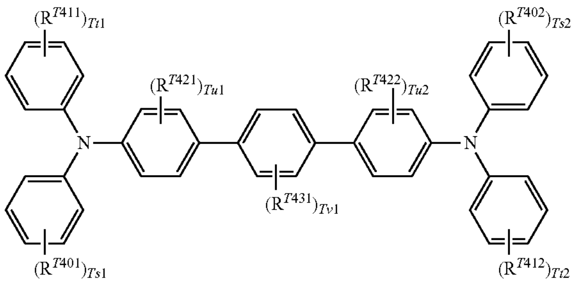

In Formula (D4), $R^{T401}$, $R^{T402}$, $R^{T411}$, and $R^{T412}$ each independently represent a halogen atom, an alkyl group having 1 or more and 5 or less carbon atoms, an alkoxy group having 1 or more and 5 or less carbon atoms, an amino group substituted with an alkyl group having 1 or 2 carbon atoms, an aryl group, $—C(R^{T41}){=}C(R^{T42})(R^{T43})$, or $—CH{=}CH—CH{=}C(R^{T44})(R^{T45})$. $R^{T41}$, $R^{T42}$, $R^{T43}$, $R^{T44}$, and $R^{T45}$ each independently represent a hydrogen atom, an alkyl group, or an aryl group. $R^{T421}$, $R^{T422}$, and $R^{T431}$ each independently represent a hydrogen atom, a halogen atom, an alkyl group having 1 or more and 5 or less carbon atoms, or an alkoxy group having 1 or more and 5 or less carbon atoms. Ts1, Ts2, Tt1, Tt2, Tu1, Tu2, and Tv1 each independently represent 0, 1, or 2.

The group in Formula (D4) may be substituted with a halogen atom, an alkyl group having 1 or more and 5 or less carbon atoms, an alkoxy group having 1 or more and 5 or less carbon atoms, or a substituted amino group substituted with an alkyl group having 1 or more and 3 or less carbon atoms.

The content of the charge transport material contained in the charge transport layer is, for example, preferably 20% by mass or greater and 70% by mass or less with respect to the total mass of the charge transport layer.

The charge transport layer contains at least the polyester resin having an aromatic ring as the binder resin. The proportion of the polyester resin having an aromatic ring in the total amount of the binder resin contained in the charge transport layer is, for example, preferably 50% by mass or greater, more preferably 80% by mass or greater, still more preferably 90% by mass or greater, particularly preferably 95% by mass or greater, and most preferably 100% by mass.

The charge transport layer may contain other binder resins in addition to the polyester resin having an aromatic ring. Examples of other binder resins include a polyester resin other than the polyester resin having an aromatic ring, a polycarbonate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic acid anhydride copolymer, a silicone resin, a silicone alkyd resin, a phenol-formaldehyde resin, a styrene-alkyd resin, poly-N-vinylcarbazole, and polysilane. These binder resins may be used alone or in combination of two or more kinds thereof.

It is preferable that the charge transport layer further contains, for example, an antioxidant.

As described above, the occurrence of filming is further suppressed in a case where the charge transport layer further contains an antioxidant.

Further, the occurrence of burn-in ghosts is suppressed in a case where the charge transport layer contains an antioxidant. Specifically, in a case where the positive charge captured by the binder resin of the charge transport layer is accumulated as cation radicals in a region with a particularly large exposure history even in the charge transport layer, the negative charge during charging in the next cycle is canceled out so that the surface potential is lowered, and thus burn-in ghosts occur. On the other hand, in a case where the charge transport layer contains an antioxidant, the cation radicals in the charge transport layer are captured by the antioxidant and disappear, and thus the occurrence of burn-in ghosts caused by the accumulation of cation radicals is assumed to be suppressed.

Further, in the present exemplary embodiment, even in a case where the charge transport layer contains an antioxidant, since the charge transport layer contains a polyester resin having an aromatic ring as a binder resin, and the weight reduction ratio of the charge transport layer is in the above-described ranges, both abrasion resistance and suppression of filming are achieved while occurrence of burn-in ghosts is suppressed.

Examples of the antioxidant include a substance having a property of preventing or suppressing the action of oxygen on an oxidizing substance present inside the electrophotographic photoreceptor or on the surface thereof under conditions such as light, heat, and discharge.

Specific examples of the antioxidant include a radical polymerization inhibitor and a peroxide decomposer. Examples of the radical polymerization inhibitor include a known antioxidant such as a hindered phenol-based antioxidant, a hindered amine-based antioxidant, a diallylamine-based antioxidant, a diallyldiamine-based antioxidant, or a hydroquinone-based antioxidants. Examples of the peroxide decomposer include a known antioxidant such as an organic sulfur-based (such as a thioether-based) antioxidant, a phosphoric acid-based antioxidant, a dithiocarbamate-based antioxidant, a thiourea-based antioxidant, or a benzimidazole-based antioxidant.

The molecular weight of the antioxidant is, for example, in a range of 200 or greater and 1000 or less, preferably 200 or greater and 450 or less, and more preferably 200 or greater and 350 or less, from the viewpoint of residual properties during drying.

In the present exemplary embodiment, even in a case where the charge transport layer contains an antioxidant having a molecular weight of 350 or less, since the charge transport layer contains a polyester resin having an aromatic ring as a binder resin, and the weight reduction ratio of the charge transport layer is in the above-described ranges, both abrasion resistance and suppression of filming are achieved while occurrence of burn-in ghosts is suppressed. From this viewpoint, the molecular weight of the antioxidant may be 350 or less, 300 or less, or 250 or less.

As the antioxidant, for example, a compound having a benzene ring in a molecule is preferable.

As the antioxidant, for example, a hindered phenol-based antioxidant is preferable. The hindered phenol-based antioxidant is a compound having a hindered phenol ring.

The hindered phenol ring is, for example, a phenol ring in which at least one alkyl group having 4 or more and 8 or less carbon atoms (such as a branched alkyl group having 4 or more and 8 or less carbon atoms) is substituted. More specifically, the hindered phenol ring is, for example, a phenol ring in which an ortho position with respect to the phenolic hydroxyl group is substituted with a tertiary alkyl group (such as a tert-butyl group). The hindered phenol ring may be a phenol ring in which both ortho positions with respect to the phenolic hydroxyl group are substituted with tertiary alkyl groups.

Examples of the hindered phenol-based antioxidant include 1) an antioxidant having one hindered phenol ring,
2) an antioxidant which has two or more and four or less hindered phenol rings and in which the two or more and four or less hindered phenol rings are linked to each other via a linking group consisting of a linear or branched divalent or higher valent and tetravalent or lower valent aliphatic hydrocarbon group or a linking group in which at least one of an ester bond (—C(═O)O—) or an ether bond (—O—) is sandwiched between carbon-carbon bonds of a divalent or higher valent and tetravalent or lower valent aliphatic hydrocarbon group, and
3) an antioxidant which has two or more and four or less hindered phenol rings and one benzene ring (unsubstituted or substituted benzene ring substituted with an alkyl group or the like) or an isocyanurate ring and in which the two or more and four or less hindered phenol rings are linked to each other via a benzene ring or an isocyanurate ring and an alkylene group.

In the present exemplary embodiment, even in a case where the charge transport layer contains 1) the hindered phenol-based antioxidant, since the charge transport layer contains a polyester resin having an aromatic ring as a binder resin, and the weight reduction ratio of the charge transport layer is in the above-described ranges, both abrasion resistance and suppression of filming are achieved while occurrence of burn-in ghosts is suppressed.

The antioxidants may be used alone or in combination of two or more kinds thereof.

From the viewpoint of suppressing burn-in ghosts, the content of the antioxidant contained in the charge transport layer is, for example, preferably 0.01% by mass or greater, more preferably 0.03% by mass or greater, and still more preferably 0.05% by mass or greater with respect to the total mass of the charge transport layer. Further, from the viewpoint of suppressing filming, the content of the antioxidant contained in the charge transport layer is, for example, preferably 0.1% by mass or less, more preferably 0.08% by mass or less, and still more preferably 0.06% by mass or less with respect to the total mass of the charge transport layer. From the viewpoint of achieving both suppression of burn-in ghosts and suppression of filming, the content of the antioxidant contained in the charge transport layer is, for example, preferably 0.01% by mass or greater and 0.1% by mass, more preferably 0.03% by mass or greater and 0.08% by mass or less, and still more preferably 0.05% by mass or greater and 0.06% by mass or less with respect to the total mass of the charge transport layer.

The charge transport layer may also contain other known additives. Examples of the additives include a leveling agent, an antifoaming agent, a filler, and a viscosity adjuster.

The charge transport layer may contain, as an additive, a volatile component that vaporizes at 100° C. or higher and 175° C. or lower. In the present exemplary embodiment, even in a case where the charge transport layer contains the above-described volatile component, since the charge transport layer contains a polyester resin having an aromatic ring as a binder resin, and the weight reduction ratio of the charge transport layer is in the above-described ranges, both abrasion resistance and suppression of filming are achieved.

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

In the present exemplary embodiment, as the solvent for preparing the coating solution for forming a charge transport layer, a solvent that vaporizes at 100° C. or higher and 175° C. or lower, that is, a solvent having a boiling point of 100° C. or higher and 175° C. or lower may be used. Examples of the solvent having a boiling point of 100° C. or higher and 175° C. or lower include cyclohexanone (boiling point: 155.6° C.) and toluene (boiling point: 110.6° C.). In the present exemplary embodiment, even in a case where a solvent having a boiling point of 100° C. or higher and 175° C. or lower is used, since the charge transport layer contains a polyester resin having an aromatic ring as a binder resin, and the weight reduction ratio of the charge transport layer is in the above-described ranges, both abrasion resistance and suppression of filming are achieved.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

The drying temperature of drying the coating film of the coating solution for forming a charge transport layer may be, for example, 120° C. or higher and 200° C. or lower. From the viewpoint of suppressing filming, the drying temperature is, for example, preferably 140° C. or higher, more preferably 160° C. or higher, and still more preferably 175° C. or higher.

The drying time for drying the coating film of the coating solution for forming a charge transport layer may be, for example, 30 minutes or longer and 80 minutes or shorter. From the viewpoint of suppressing filming, the drying time is, for example, preferably 30 minutes or longer, more preferably 40 minutes or longer, and still more preferably 50 minutes or longer.

Single Layer Type Photosensitive Layer

The single layer type photosensitive layer (charge generation/charge transport layer) is a layer containing a charge generation material, a charge transport material, a binder resin, and as necessary, other additives. These materials are the same as the materials described in the sections of the charge generation layer and the charge transport layer.

The single layer type photosensitive layer contains at least the polyester resin having an aromatic ring as a binder resin. The proportion of the polyester resin having an aromatic ring in the total amount of the binder resin contained in the single layer type photosensitive layer is, for example, preferably 50% by mass or greater, more preferably 80% by mass or greater, still more preferably 90% by mass or greater, particularly preferably 95% by mass or greater, and most preferably 100% by mass.

The content of the charge generation material in the single layer type photosensitive layer may be, for example, 0.1% by mass or greater and 10% by mass or less and preferably 0.8% by mass or greater and 5% by mass or less with respect to the total solid content.

The content of the charge transport material contained in the single layer type photosensitive layer may be, for example, 40% by mass or greater and 60% by mass or less with respect to the total solid content.

It is preferable that the single layer type photosensitive layer further contains, for example, an antioxidant.

In a case where the single layer type photosensitive layer contains an antioxidant, the occurrence of burn-in ghosts is suppressed.

Further, in the present exemplary embodiment, even in a case where the single layer type photosensitive layer contains an antioxidant, since the single layer type photosensitive layer contains a polyester resin having an aromatic ring as a binder resin, and the weight reduction ratio of the single layer type photosensitive layer is in the above-described ranges, both abrasion resistance and suppression of filming are achieved while occurrence of burn-in ghosts is suppressed.

The details of the antioxidant are the same as the details of the antioxidant described in the section of the charge transport layer.

From the viewpoint of suppressing burn-in ghosts, the content of the antioxidant contained in the single layer type photosensitive layer is, for example, preferably 0.01% by mass or greater, more preferably 0.03% by mass or greater, and still more preferably 0.05% by mass or greater with respect to the total mass of the single layer type photosensitive layer. Further, from the viewpoint of suppressing filming, the content of the antioxidant contained in the single layer type photosensitive layer is, for example, preferably 0.1% by mass or less, more preferably 0.08% by mass or less, and still more preferably 0.06% by mass or less with respect to the total mass of the single layer type photosensitive layer.

From the viewpoint of achieving both suppression of burn-in ghosts and suppression of filming, the content of the antioxidant contained in the single layer type photosensitive layer is, for example, preferably 0.01% by mass or greater and 0.1% by mass or less, more preferably 0.03% by mass or greater and 0.08% by mass or less, and still more preferably 0.05% by mass or greater and 0.06% by mass or less with respect to the total mass of the single layer type photosensitive layer.

The single layer type photosensitive layer may contain, as an additive, a volatile component that vaporizes at 100° C. or higher and 175° C. or lower. In the present exemplary embodiment, even in a case where the single layer type photosensitive layer contains the above-described volatile component, since the single layer type photosensitive layer contains a polyester resin having an aromatic ring as a binder resin, and the weight reduction ratio of the single layer type photosensitive layer is in the above-described ranges, both abrasion resistance and suppression of filming are achieved.

The method of forming the single layer type photosensitive layer is the same as the method of forming the charge generation layer or the charge transport layer.

In the present exemplary embodiment, a solvent having a boiling point of 100° C. or higher and 175° C. or lower may be used as the solvent for preparing the coating solution for forming a single layer type photosensitive layer. The details of the solvent having a boiling point of 100° C. or higher and 175° C. or lower are the same as the details of the solvent described in the section of the charge transport layer.

In the present exemplary embodiment, even in a case where a solvent having a boiling point of 100° C. or higher and 175° C. or lower is used, since the single layer type photosensitive layer contains a polyester resin having an aromatic ring as a binder resin, and the weight reduction ratio of the single layer type photosensitive layer is in the above-described ranges, both abrasion resistance and suppression of filming are achieved.

The drying temperature of drying the coating film of the coating solution for forming a single layer type photosensitive layer may be, for example, 120° C. or higher and 200° C. or lower. From the viewpoint of suppressing filming, the drying temperature is, for example, preferably 140° C. or higher, more preferably 160° C. or higher, and still more preferably 175° C. or higher.

The drying time for drying the coating film of the coating solution for forming a single layer type photosensitive layer may be, for example, 30 minutes or longer and 80 minutes or shorter. From the viewpoint of suppressing filming, the drying time is, for example, preferably 30 minutes or longer, more preferably 40 minutes or longer, and still more preferably 50 minutes or longer.

Image Forming Apparatus and Process Cartridge

An image forming apparatus according to the present exemplary embodiment includes the electrophotographic photoreceptor, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium. Further, the electrophotographic photoreceptor according to the present exemplary embodiment is employed as the electrophotographic photoreceptor.

As the image forming apparatus according to the present exemplary embodiment, known image forming apparatuses such as an apparatus including a fixing device that fixes a toner image transferred to the surface of a recording medium; a direct transfer type apparatus that transfers a toner image formed on the surface of an electrophotographic photoreceptor directly to a recording medium; an intermediate transfer type apparatus that primarily transfers a toner image formed on the surface of an electrophotographic photoreceptor to the surface of an intermediate transfer member and secondarily transfers the toner image transferred to the surface of the intermediate transfer member to the surface of a recording medium; an apparatus including a cleaning device that cleans the surface of an electrophotographic photoreceptor after the transfer of a toner image and before the charging; an apparatus including a destaticizing device that destaticizes the surface of an electrophotographic photoreceptor by irradiating the surface with destaticizing light after the transfer of a toner image and before the charging; and an apparatus including an electrophotographic photoreceptor heating member for increasing the temperature of an electrophotographic photoreceptor and decreasing the relative temperature are employed.

In a case of the intermediate transfer type apparatus, the transfer device is, for example, configured to include an intermediate transfer member having a surface onto which the toner image is transferred, a primary transfer device primarily transferring the toner image formed on the surface of the electrophotographic photoreceptor to the surface of the intermediate transfer member, and a secondary transfer device secondarily transferring the toner image transferred to the surface of the intermediate transfer member to the surface of the recording medium.

The image forming apparatus according to the present exemplary embodiment may be any of a dry development type image forming apparatus or a wet development type (development type using a liquid developer) image forming apparatus.

Further, in the image forming apparatus according to the present exemplary embodiment, for example, the portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. Further, the process cartridge may include, for example, at least one selected from the group consisting of a charging device, an electrostatic latent image forming device, a developing device, and a transfer device in addition to the electrophotographic photoreceptor.

Hereinafter, an example of the image forming apparatus according to the present exemplary embodiment will be described, but the present exemplary embodiment is not limited thereto. Further, main parts shown in the figures will be described, but description of other parts will not be provided.

Figure 3:
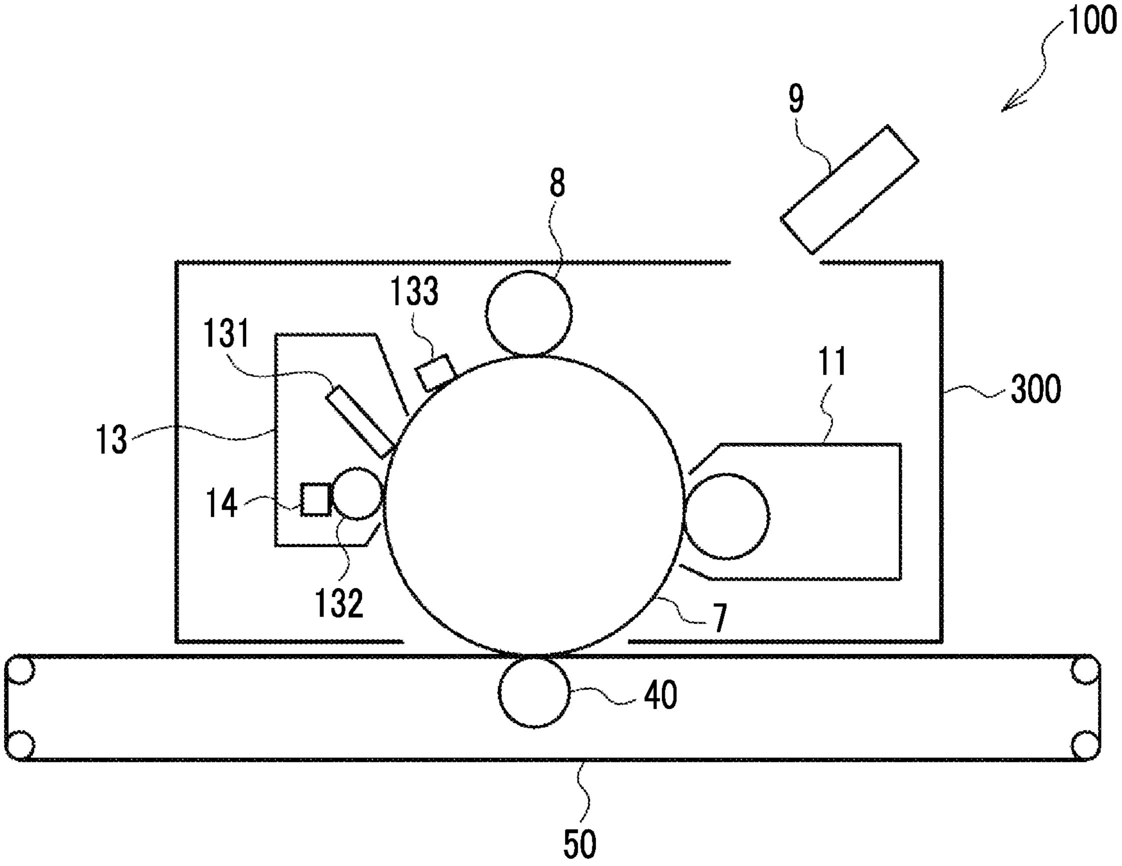
FIG. 3 is a schematic configuration view showing an example of an image forming apparatus according to the present exemplary embodiment.

FIG. 3 is a schematic configuration view showing an example of an image forming apparatus according to the present exemplary embodiment.

As shown in FIG. 3, an image forming apparatus 100 according to the present exemplary embodiment includes a process cartridge 300 including an electrophotographic photoreceptor 7, an exposure device 9 (an example of an electrostatic latent image forming device), a transfer device 40 (primary transfer device), and an intermediate transfer member 50. Further, in the image forming apparatus 100, the exposure device 9 is disposed at a position that can be exposed to the electrophotographic photoreceptor 7 from an opening portion of the process cartridge 300, the transfer device 40 is disposed at a position that faces the electrophotographic photoreceptor 7 via the intermediate transfer member 50, and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). Further, the intermediate transfer member 50, the transfer device 40 (primary transfer device), and the secondary transfer device (not shown) correspond to an example of the transfer device.

The process cartridge 300 in FIG. 3 integrally supports the electrophotographic photoreceptor 7, a charging device 8 (an example of the charging device), a developing device 11 (an example of the developing device), and a cleaning device 13 (an example of the cleaning device) in a housing. The cleaning device 13 has a cleaning blade (an example of the cleaning member) 131, and the cleaning blade 131 is disposed to come into contact with the surface of the electrophotographic photoreceptor 7. Further, the cleaning member may be a conductive or insulating fibrous member instead of the aspect of the cleaning blade 131, and may be used alone or in combination with the cleaning blade 131.

Further, FIG. 3 shows an example of an image forming apparatus including a fibrous member 132 (roll shape) that supplies a lubricant 14 to the surface of the electrophotographic photoreceptor 7 and a fibrous member 133 (flat brush shape) that assists cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. Further, a known charger such as a non-contact type roller charger, a scorotron charger or a corotron charger using corona discharge, or the like is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. The wavelength of the light source is within the spectral sensitivity region of the electrophotographic photoreceptor. As the wavelength of a semiconductor laser, near infrared, which has an oscillation wavelength in the vicinity of 780 nm, is mostly used. However, the wavelength is not limited thereto, and a laser having an oscillation wavelength of 600 nm level or a laser having an oscillation wavelength of 400 nm or greater and 450 nm or less as a blue laser may also be used. Further, a surface emission type laser light source capable of outputting a multi-beam is also effective for forming a color image.

Developing Device

Examples of the developing device 11 include a typical developing device that performs development in contact or non-contact with the developer. The developing device 11 is not particularly limited as long as the developing device has the above-described functions, and is selected depending on the purpose thereof. Examples of the developing device include known developing machines having a function of attaching a one-component developer or a two-component developer to the electrophotographic photoreceptor 7 using a brush, a roller, or the like. Among these, for example, a developing device formed of a developing roller having a surface on which a developer is held is preferably used.

The developer used in the developing device 11 may be a one-component developer containing only a toner or a two-component developer containing a toner and a carrier. Further, the developer may be magnetic or non-magnetic. Known developers are employed as these developers.

Cleaning Device

As the cleaning device 13, a cleaning blade type device including the cleaning blade 131 is used.

In addition to the cleaning blade type device, a fur brush cleaning type device or a simultaneous development cleaning type device may be employed.

Transfer Device

Examples of the transfer device 40 include a known transfer charger such as a contact-type transfer charger using a belt, a roller, a film, a rubber blade, or the like, or a scorotron transfer charger or a corotron transfer charger using corona discharge.

Intermediate Transfer Member

As the intermediate transfer member 50, a belt-like intermediate transfer member (intermediate transfer belt) containing semi-conductive polyimide, polyamide-imide, polycarbonate, polyarylate, polyester, rubber, or the like is used. Further, as the form of the intermediate transfer member, a drum-like intermediate transfer member may be used in addition to the belt-like intermediate transfer member.

Figure 4:
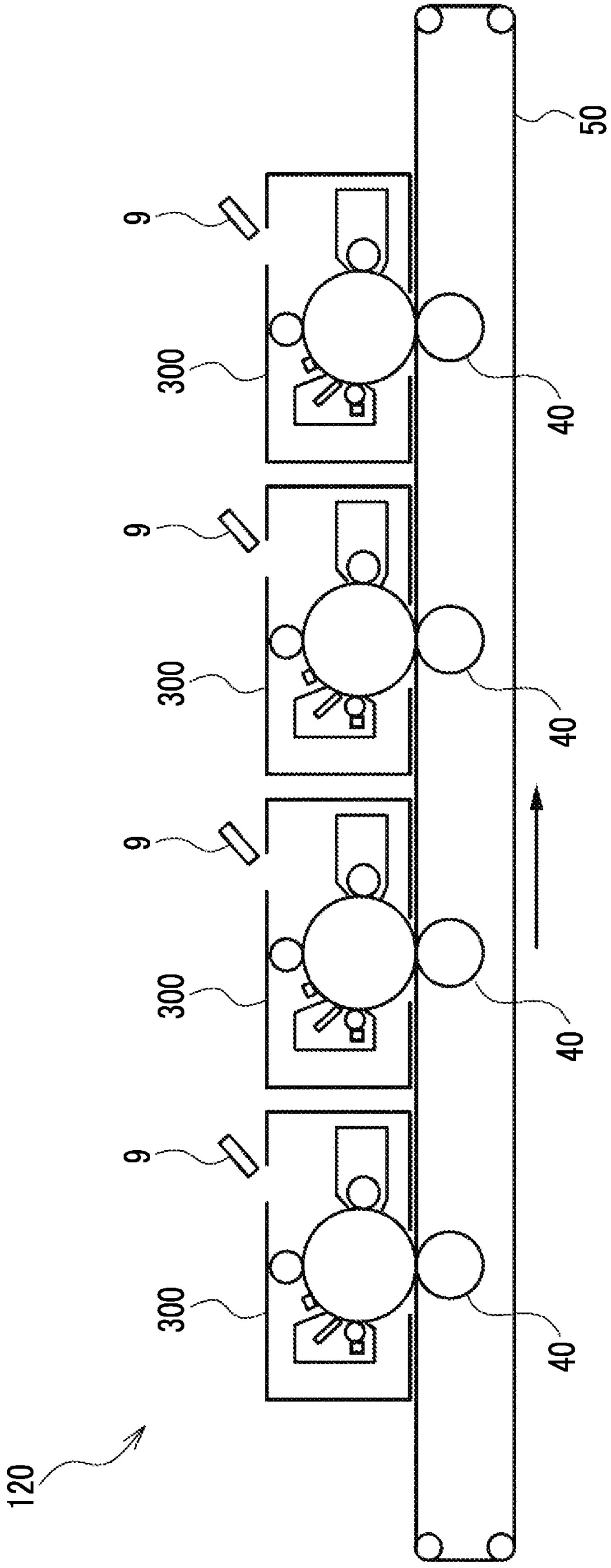
FIG. 4 is a schematic configuration view showing another example of an image forming apparatus according to the present exemplary embodiment.

FIG. 4 is a schematic configuration view showing an example of an image forming apparatus according to the present exemplary embodiment.

An image forming apparatus 120 shown in FIG. 4 is a tandem type multicolor image forming apparatus on which four process cartridges 300 are mounted. The image forming apparatus 120 is formed such that four process cartridges 300 are arranged in parallel on the intermediate transfer member 50, and one electrophotographic photoreceptor is used for each color. Further, the image forming apparatus 120 has the same configuration as the image forming apparatus 100 except that the image forming apparatus 120 is of a tandem type.

EXAMPLES

Hereinafter, exemplary embodiments of the invention will be described in detail based on examples, but the exemplary embodiments of the invention are not limited to the examples.

In the following description, “parts” and “%” are on a mass basis unless otherwise specified.

In the following description, the synthesis, the treatment, the production, and the like are carried out at room temperature (25° C.±3° C.) unless otherwise specified.

Preparation of Polyester Resin and Polycarbonate Resin

Polyester resins (PE1) to (PE7) and a polycarbonate resin (PC1) are prepared. Table 1 shows units and compositions constituting the polyester resins. Table 2 shows units and compositions constituting the polycarbonate resins.

A2-3 and the like listed in Table 1 are specific examples of the dicarboxylic acid unit (A) described above.

B1-4 and the like listed in Table 1 are specific examples of the diol unit (B) described above.

Ca2-3 and Cb6-3 listed in Table 2 are constitutional units having the following structures.

TABLE 1

| | Dicarboxylic acid unit 1 | | Dicarboxylic acid unit 2 | | Diol unit | |
|---|---|---|---|---|---|---|
| Resin No. | Resin | Ratio (mol %) | Resin | Ratio (mol %) | Resin | Ratio (mol %) |
| PE1 | A2-3 | 50 | — | — | B1-4 | 50 |
| PE2 | A2-3 | 50 | — | — | B5-1 | 50 |
| PE3 | A2-3 | 50 | — | — | B1-2 | 50 |

TABLE 1-continued

| | Dicarboxylic acid unit 1 | | Dicarboxylic acid unit 2 | | Diol unit | |
|---|---|---|---|---|---|---|
| Resin No. | Resin | Ratio (mol %) | Resin | Ratio (mol %) | Resin | Ratio (mol %) |
| PE4 | A2-3 | 50 | — | — | B2-6 | 50 |
| PE5 | A3-2 | 50 | — | — | B1-2 | 50 |
| PE6 | A3-2 | 40 | A4-3 | 10 | B6-4 | 50 |
| PE7 | A3-2 | 50 | — | — | B4-4 | 50 |

TABLE 2

| | Constitutional unit 1 | | Dicarboxylic acid unit 2 | | Diol unit | |
|---|---|---|---|---|---|---|
| Resin No. | Resin | Ratio (mol %) | Resin | Ratio (mol %) | Resin | Ratio (mol %) |
| PC1 | Ca2-3 | 25 | Cb6-3 | 75 | B1-4 | 50 |

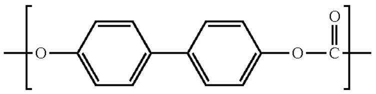

(Ca2-3)

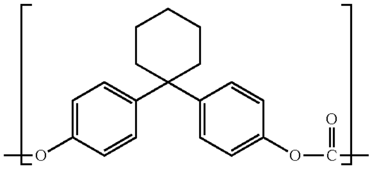

(Cb6-3)

Production of Photoreceptor Including Lamination Type Photosensitive Layer

Examples S1 to S16 and Comparative Examples S1 to S7

Formation of Undercoat Layer

An aluminum cylindrical tube having an outer diameter of 30 mm, a length of 365 mm, and a thickness of 1 mm is prepared as a conductive substrate.

100 parts of zinc oxide (average particle diameter of 70 nm, specific surface area of 15 $m^2$/g, manufactured by Tayca Corporation) is stirred and mixed with 500 parts of toluene, 1.3 parts of a silane coupling agent (trade name: KBM603, manufactured by Shin-Etsu Chemical Co., Ltd., N-2-(aminoethyl)-3-aminopropyltrimethoxysilane) is added thereto, and the mixture is stirred for 2 hours. Thereafter, toluene is distilled off under reduced pressure and baked at 120° C. for 3 hours to obtain zinc oxide subjected to a surface treatment with a silane coupling agent.

110 parts of the surface-treated zinc oxide is stirred and mixed with 500 parts of tetrahydrofuran, a solution obtained by dissolving 0.6 part of alizarin in 50 parts of tetrahydrofuran is added thereto, and the mixture is stirred at 50° C. for 5 hours. Thereafter, the solid content is separated by filtration by carrying out filtration under reduced pressure and dried at 60° C. under reduced pressure, thereby obtaining zinc oxide with alizarin.

100 parts of a solution obtained by dissolving 60 parts of the zinc oxide with alizarin, 13.5 parts of a curing agent (blocked isocyanate, trade name: SUMIDUR 3175, manufactured by Sumitomo Bayer Urethane Co., Ltd.), and 15 parts of a butyral resin (trade name: S-LEC BM-1, manufactured by Sekisui Chemical Co., Ltd.) in 68 parts of methyl ethyl ketone is mixed with 5 parts of methyl ethyl ketone, and the solution is dispersed in a sand mill for 2 hours using 1 mmφ glass beads, thereby obtaining a dispersion liquid. 0.005 part of dioctyltin dilaurate as a catalyst and 4 parts of silicone resin particles (trade name: TOSPEARL 145, manufactured by Momentive Performance Materials Inc.) are added to the dispersion liquid, thereby obtaining a coating solution for forming an undercoat layer. The outer peripheral surface of the conductive substrate is coated with the coating solution for forming an undercoat layer by a dip coating method, and dried and cured at 170° C. for 40 minutes to form an undercoat layer. The average thickness of the undercoat layer is 25 μm.

Formation of Charge Generation Layer

A mixture of 15 parts of hydroxygallium phthalocyanine as a charge generation material (Bragg angle (2θ±0.2°) of the X-ray diffraction spectrum using Cuka characteristic X-ray has diffraction peaks at positions at least of 7.5°, 9.9°, 12.5, 16.3°, 18.6°, 25.1°, and 28.3°), 10 parts of a vinyl chloride-vinyl acetate copolymer resin (trade name: VMCH, Nippon Unicar Company Limited) as a binder resin, and 200 parts of n-butyl acetate is dispersed in a sand mill for 4 hours using glass beads having a diameter of 1 mm. 175 parts of n-butyl acetate and 180 parts of methyl ethyl ketone are added to the dispersion liquid, and the mixture is stirred, thereby obtaining a coating solution for forming a charge generation layer. The undercoat layer is immersed in and coated with the coating solution for forming a charge generation layer, and dried at room temperature (25° C.±3° C.) to form a charge generation layer having an average thickness of 0.18 μm.

Formation of Charge Transport Layer 60 parts of a resin of the type listed in Tables 3 and 4 as a binder resin, 40 parts of HTM-1 as a charge transport material, and an antioxidant of the type in the addition amount listed in Tables 3 and 4 as an antioxidant are dissolved in a solvent of the type in the addition amount listed in Tables 3 and 4, thereby obtaining a coating solution for forming a charge transport layer. The charge generation layer is immersed in and coated with the coating solution for forming a charge transport layer, dried at the temperature listed in Tables 3 and 4 for the time listed in Tables 3 and 4, thereby forming a charge transport layer with the average thickness listed in Tables 3 and 4.

The charge transport material HTM-1 is the following compound.

The antioxidants HP-1 (molecular weight: 220.35) and HP-2 (molecular weight: 382.59) listed in Tables 3 and 4 are the following compounds.

The weight reduction ratio of the charge transport layer ("weight reduction ratio" in the tables), the ratio of the weight reduction amount of the charge transport layer to the total amount of the binder resin ("weight reduction amount vs resin" in the tables), and values of W×T ("W×T" in the tables) are collectively listed in Tables 3 and 4.

In the tables, "THF" represents tetrahydrofuran, "Tol" represents toluene, and "CHO" represents cyclohexanone.

Further, in the tables, "-" denotes that the antioxidant is not added or the weight reduction ratio is lower than or equal to the detection limit.

HTM-1

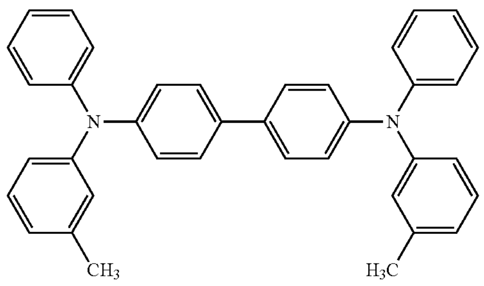

(HP-1)

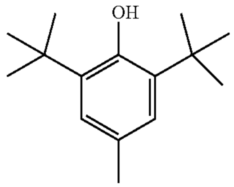

(HP-2)

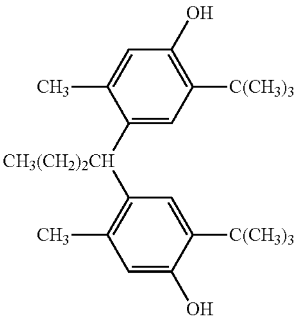

Production of Photoreceptor Including Single Layer Type Photosensitive Layer

Examples T1 to T4 and Comparative Examples T1 to T4

Formation of Single Layer Type Photosensitive Layer 45.75 parts of the polyester resin of the type listed in Table 5 as a binder resin, 1.25 parts of V-type hydroxygallium phthalocyanine as a charge generation material (Bragg angle (2θ±0.2°) of the X-ray diffraction spectrum using Cuka characteristic X-ray has diffraction peaks at positions of at least 7.3°, 16.0°, 24.9°, and 28.0°), 9 parts of ETM-1 as an electron transport material, 44 parts of HTM-1 that is a positive hole transport material as a charge transport material, an antioxidant of the type in the addition amount listed in Table 5 as an antioxidant, and a solvent of the type in the addition amount listed in Table 5 as a solvent are mixed, and the mixture is subjected to a dispersion treatment in a sand mill for 4 hours using glass beads having a diameter of 1 mm, thereby obtaining a coating solution for forming a single layer type photosensitive layer.

An aluminum substrate having an outer diameter of 30 mm, a length of 244.5 mm, and a thickness of 1 mm is coated with the obtained coating solution for forming a photosensitive layer by a dip coating method, and dried at the temperature listed in Table 5 for the time listed in Table 5, thereby forming a single layer type photosensitive layer having the average thickness listed in Table 5.

The electron transport material ETM-1 and the charge transport material HTM-1 are the following compounds.

The antioxidant HP-1 (molecular weight: 220.35) listed in Table 5 is the above-described compound.

The weight reduction ratio of the single layer type photosensitive layer ("weight reduction ratio" in the table), the ratio of the weight reduction amount of the single layer type photosensitive layer to the total amount of the binder resin ("weight reduction amount vs resin" in the table), and values of W×T ("W×T" in the table) are collectively listed in Table 5.

In the tables, "THF" represents tetrahydrofuran, "Tol" represents toluene, and "CHO" represents cyclohexanone.

ETM-1

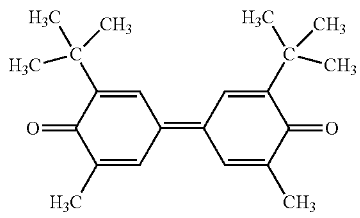

HTM-1

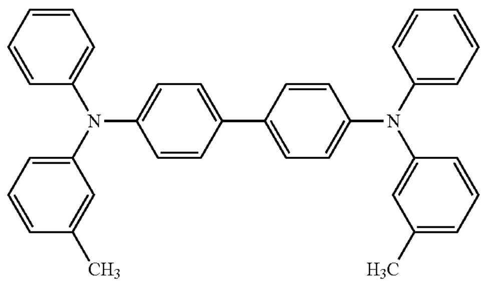

Performance Evaluation of Photoreceptor

Abrasion Resistance

The photoreceptor is mounted on an electrophotographic type image forming apparatus (DocuCentre f1100, manufactured by FUJIFILM Business Innovation Corporation), and a 100% solid image with an image density (area coverage) of 100% is printed on 100,000 sheets of A3 size plain paper in an environment of a temperature of 10° C. and a relative humidity of 15%. The average thickness of the charge transport layer (or the single layer type photosensitive layer) is acquired before and after the image formation, and a difference in the average thickness before and after the image formation is defined as the amount of abrasion (nm). A PERMASCOPE (manufactured by Fisher Instruments K.K.) is used as a film thickness measuring machine.

The amount of abrasion is classified as follows. The results are listed in Tables 3 to 5 ("abrasion resistance" in the tables).

A: The amount of abrasion is less than 500 nm

B: The amount of abrasion is 500 nm or greater and less than 1,000 nm

C: The amount of abrasion is 1,000 nm or greater

Filming

The photoreceptor is mounted on an electrophotographic type image forming apparatus (Apeos C7070, manufactured by FUJIFILM Business Innovation Corporation). Image quality patterns with an image density of 10% are continuously output onto 500 sheets of A3 size plain paper and then continuously output onto 50,000 sheets of A3 size plain paper in a high-temperature and high-humidity environment of a temperature of 28° C. and a relative humidity of 85%, the photoreceptor after the evaluation is performed is taken out, the surface thereof is directly observed with a confocal laser microscope (OLS1100, manufactured by OLYMPUS Corporation), and filming at the initial stage and after the continuous image formation is evaluated according to the following evaluation standards. The results are listed in Tables 3 to 5 ("filming" in the tables).

Evaluation of Filming

A: No adhesion (filming) of the toner to the surface of the photoreceptor is observed both at the initial stage and after the continuous image formation.

B: Adhesion (filming) of the toner to the surface of the photoreceptor is not observed at the initial stage and is observed after the continuous image formation, but the toner is removed by wiping the surface with a non-woven fabric moistened with alcohol.

C: Adhesion (filming) of the toner to the surface of the photoreceptor is observed at the initial stage and after the continuous image formation, but the toner is removed by wiping the surface with a non-woven fabric moistened with alcohol.

D: Adhesion (filming) of the toner to the surface of the photoreceptor is observed at the initial stage and after the continuous image formation, and the toner cannot be removed even in a case of wiping the surface with a non-woven fabric moistened with alcohol.

TABLE 3

| | Resin | Antioxidant | | Solvent | | Drying step | | Average | Weight | Weight reduction amount | | Evaluation | |
|---|---|---|---|---|---|---|---|---|---|---|---|---|---|
| | Type | Type | Addition amount (parts) | Type | Addition amount (parts) | Temperature (° C.) | Time (min) | thickness (μm) | reduction ratio (mass %) | vs Resin (mass %) | W × T | Abrasion resistance | Filming |
| Example S1 | PE1 | HP-1 | 1 | THF/Tol | 270/30 | 175 | 40 | 40 | 0.06 | 0.10 | 2.4 | A | A |
| Example S2 | PE1 | HP-1 | 1 | THF/Tol | 270/30 | 140 | 80 | 40 | 0.08 | 0.14 | 3.2 | A | B |
| Example S3 | PE1 | HP-1 | 5 | THF/Tol | 270/30 | 175 | 80 | 40 | 0.07 | 0.12 | 2.8 | A | B |
| Example S4 | PE1 | HP-1 | 1 | THF/Tol | 270/30 | 165 | 40 | 40 | 0.08 | 0.14 | 3.2 | A | B |
| Example S5 | PE1 | HP-2 | 1 | THF/Tol | 270/30 | 165 | 40 | 40 | 0.10 | 0.16 | 4.0 | A | C |
| Example S6 | PE2 | HP-1 | 1 | THF/Tol | 270/30 | 175 | 40 | 40 | 0.07 | 0.12 | 2.8 | A | A |

TABLE 3-continued

| | Resin Type | Antioxidant Type | Antioxidant Addition amount (parts) | Solvent Type | Solvent Addition amount (parts) | Drying step Temperature (° C.) | Drying step Time (min) | Average thickness (μm) | Weight reduction ratio (mass %) | Weight reduction amount vs Resin (mass %) | W × T | Evaluation Abrasion resistance | Evaluation Filming |
|---|---|---|---|---|---|---|---|---|---|---|---|---|---|
| Example S7 | PE3 | HP-1 | 1 | THF/Tol | 270/30 | 175 | 40 | 40 | 0.08 | 0.14 | 3.2 | A | A |
| Example S8 | PE4 | HP-1 | 1 | THF/Tol | 270/30 | 175 | 40 | 40 | 0.07 | 0.12 | 2.8 | A | A |
| Example S9 | PE5 | HP-1 | 1 | THF/Tol | 270/30 | 175 | 40 | 40 | 0.08 | 0.14 | 3.2 | B | A |
| Example S10 | PE6 | HP-1 | 1 | THF/Tol | 270/30 | 175 | 40 | 40 | 0.08 | 0.14 | 3.2 | B | A |
| Example S11 | PE7 | HP-1 | 1 | THF/Tol | 270/30 | 175 | 40 | 40 | 0.08 | 0.14 | 3.2 | B | A |

TABLE 4

| | Resin Type | Antioxidant Type | Antioxidant Addition amount (parts) | Solvent Type | Solvent Addition amount (parts) | Drying step Temperature (° C.) | Drying step Time (min) | Average thickness (μm) | Weight reduction ratio (mass %) | Weight reduction amount vs Resin (mass %) | W × T | Evaluation Abrasion resistance | Evaluation Filming |
|---|---|---|---|---|---|---|---|---|---|---|---|---|---|
| Example S12 | PE1 | HP-1 | 1 | THF/Tol | 270/30 | 175 | 60 | 48 | 0.08 | 0.14 | 3.8 | A | B |
| Example S13 | PE1 | HP-1 | 1 | THF/Tol | 270/30 | 165 | 40 | 48 | 0.09 | 0.16 | 4.3 | A | C |
| Example S14 | PE1 | HP-1 | 1 | CHO | 300 | 175 | 80 | 40 | 0.08 | 0.14 | 3.2 | A | B |
| Example S15 | PE1 | — | — | THF/Tol | 270/30 | 175 | 40 | 40 | — (Detection limit) | — | — | A | C |
| Example S16 | PE1 | HP-1 | 1 | THF/Tol | 270/30 | 175 | 40 | 30 | 0.06 | 0.10 | 1.9 | B | A |
| Comparative Example S1 | PE1 | HP-1 | 1 | THF/Tol | 270/30 | 140 | 40 | 40 | 0.15 | 0.25 | 6.0 | A | D |
| Comparative Example S2 | PE1 | HP-1 | 1 | THF/Tol | 270/30 | 175 | 20 | 40 | 0.20 | 0.34 | 8.0 | A | D |
| Comparative Example S3 | PE1 | HP-1 | 5 | THF/Tol | 270/30 | 175 | 40 | 40 | 0.18 | 0.30 | 7.2 | A | D |
| Comparative Example S4 | PC1 | HP-1 | 1 | THF/Tol | 270/30 | 175 | 40 | 40 | 0.07 | 0.12 | 2.8 | C | A |
| Comparative Example S5 | PE1 | HP-1 | 1 | CHO | 300 | 175 | 40 | 40 | 0.25 | 0.42 | 10 | A | D |
| Comparative Example S6 | PE1 | HP-1 | 1 | THF/Tol | 270/30 | 175 | 40 | 20 | 0.04 | 0.07 | 0.8 | C | A |
| Comparative Example S7 | PE1 | HP-1 | 1 | THF/Tol | 270/30 | 175 | 40 | 55 | 0.12 | 0.20 | 6.6 | A | D |

TABLE 5

| | Resin Type | Antioxidant Type | Antioxidant Addition amount (parts) | Solvent Type | Solvent Addition amount (parts) | Drying step Temperature (° C.) | Drying step Time (min) | Average thickness (μm) | Weight reduction ratio (mass %) | Weight reduction amount vs Resin (mass %) | W × T | Evaluation Abrasion resistance | Evaluation Filming |
|---|---|---|---|---|---|---|---|---|---|---|---|---|---|
| Example T1 | PE1 | HP-1 | 1 | THF/Tol | 270/30 | 175 | 40 | 40 | 0.05 | 0.07 | 2.0 | A | A |
| Example T2 | PE1 | HP-1 | 1 | THF/Tol | 270/30 | 140 | 80 | 40 | 0.09 | 0.13 | 3.6 | A | B |
| Example T3 | PE1 | HP-1 | 5 | THF/Tol | 270/30 | 175 | 80 | 40 | 0.07 | 0.10 | 2.8 | A | B |
| Example T4 | PE1 | HP-1 | 1 | THF/Tol | 270/30 | 175 | 60 | 48 | 0.08 | 0.12 | 3.8 | A | B |

TABLE 5-continued

| | Resin | Antioxidant | | Solvent | | Drying step | | Average | Weight reduction | Weight reduction amount vs | | Evaluation | |
|---|---|---|---|---|---|---|---|---|---|---|---|---|---|
| | Type | Type | Addition amount (parts) | Type | Addition amount (parts) | Temperature (° C.) | Time (min) | thickness (μm) | ratio (mass %) | Resin (mass %) | W × T | Abrasion resistance | Filming |
| Comparative Example T1 | PE1 | HP-1 | 1 | THF/Tol | 270/30 | 165 | 40 | 48 | 0.15 | 0.22 | 7.2 | A | C |
| Comparative Example T2 | PE1 | HP-1 | 1 | THF/Tol | 270/30 | 140 | 40 | 40 | 0.17 | 0.25 | 6.8 | A | D |
| Comparative Example T3 | PC1 | HP-1 | 1 | THF/Tol | 270/30 | 175 | 40 | 40 | 0.07 | 0.10 | 2.8 | C | A |
| Comparative Example T4 | PE1 | HP-1 | 1 | CHO | 300 | 175 | 40 | 40 | 0.21 | 0.31 | 8.4 | A | D |

The present disclosure includes the following aspects.

(((1)))

An electrophotographic photoreceptor comprising:

a conductive substrate; and a lamination type photosensitive layer including a charge generation layer and a charge transport layer or a single layer type photosensitive layer that is a photosensitive layer disposed on the conductive substrate, wherein the charge transport layer or the single layer type photosensitive layer is an outermost layer and contains a charge transport material and a binder resin containing a polyester resin having an aromatic ring, the charge transport layer or the single layer type photosensitive layer has an average thickness of 28 μm or greater and 50 μm or less, and a weight reduction ratio of the charge transport layer or the single layer type photosensitive layer from 30° C. to 175° C. in thermogravimetric analysis is 0.1% by mass or less.

(((2)))

The electrophotographic photoreceptor according to (((1))), wherein the charge transport layer or the single layer type photosensitive layer further contains an antioxidant.

(((3)))

The electrophotographic photoreceptor according to (((2))), wherein the antioxidant has a molecular weight of 350 or less.

(((4)))

The electrophotographic photoreceptor according to any one of (((1))) to (((3))), wherein the polyester resin is a polyester resin (1) having a dicarboxylic acid unit (A) represented by Formula (A) and a diol unit (B) represented by Formula (B).

Formula (A)

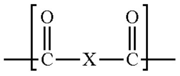

Formula (B)

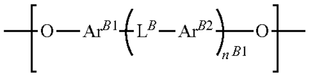

In Formula (A), X represents an organic group.

In Formula (B), $Ar^{B1}$ and $Ar^{B2}$ each independently represent an aromatic ring that may have a substituent, $L^B$ represents a single bond, an oxygen atom, a sulfur atom, or $-C(Rb^1)(Rb^2)-$, and $n^{B1}$ represents 0, 1, or 2. $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

(((5)))

The electrophotographic photoreceptor according to (((4))), wherein the dicarboxylic acid unit (A) is a dicarboxylic acid unit (A') represented by Formula (A').

Formula (A')

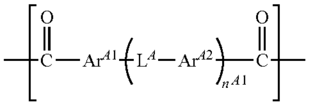

In Formula (A'), $Ar^{A1}$ and $Ar^{A2}$ each independently represent an aromatic ring that may have a substituent, $L^A$ represents a single bond or a divalent linking group, and $n^{A1}$ represents 0, 1, or 2.

(((6)))

The electrophotographic photoreceptor according to (((4))) or (((5))), wherein the dicarboxylic acid unit (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented by Formula (A4).

Formula (A1)

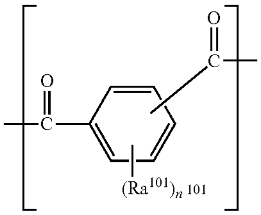

-continued

Formula (A2)

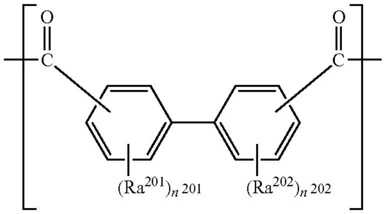

Formula (A3)

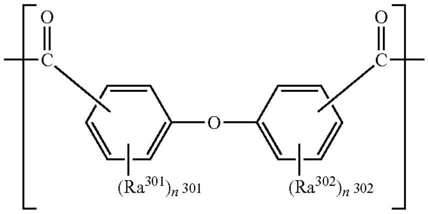

Formula (A4)

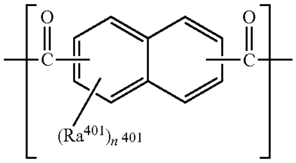

In Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms.

In Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms.

In Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms.

In Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

(((7)))

The electrophotographic photoreceptor according to any one of (((4))) to (((6))), wherein the diol unit (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8).

Formula (B1)

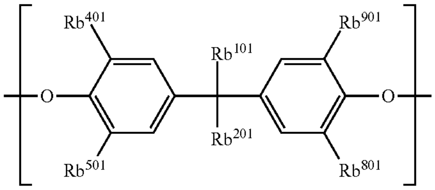

Formula (B2)

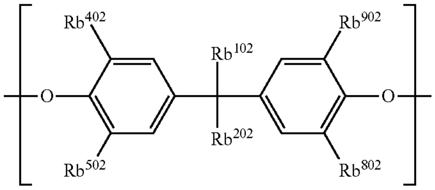

Formula (B3)

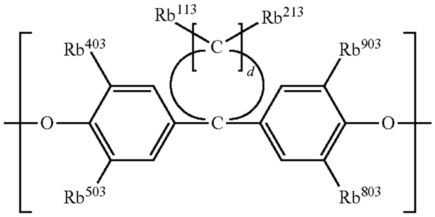

Formula (B4)

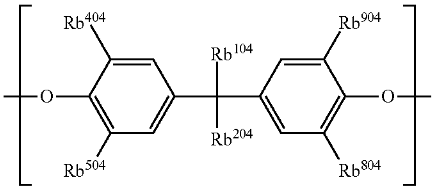

Formula (B5)

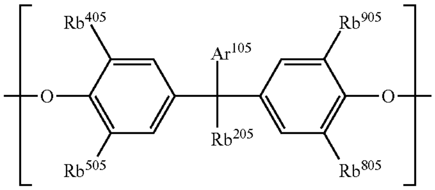

Formula (B6)

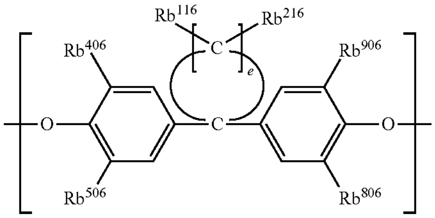

Formula (B7)

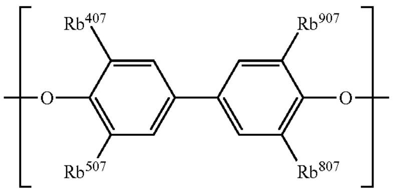

-continued

Formula (B8)

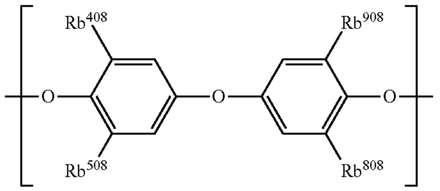

In Formula (B1), $Rb^{101'}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom.

In Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom.

In Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom.

In Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom.

In Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom.

In Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom.

In Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom.

In Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

(((8)))

The electrophotographic photoreceptor according to any one of (((1))) to (((7))), wherein the charge transport layer or the single layer type photosensitive layer has an average thickness of 30 μm or greater and 50 μm or less.

(((9)))

The electrophotographic photoreceptor according to any one of (((1))) to (((8))), wherein a weight reduction amount of the charge transport layer or the single layer type photosensitive layer from 30° C. to 175° C. in the thermogravimetric analysis is 0.18% by mass or less with respect to a total amount of the binder resin.

(((10)))

The electrophotographic photoreceptor according to any one of (((1))) to (((9))), wherein in a case where the weight reduction ratio of the charge transport layer or the single layer type photosensitive layer from 30° C. to 175° C. in the thermogravimetric analysis is defined as W % by mass, and the average thickness of the charge transport layer or the single layer type photosensitive layer is defined as T μm, a value of W×T is 4.2 or less.

(((11)))

A process cartridge comprising:

the electrophotographic photoreceptor according to any one of (((1))) to (((10))), wherein the process cartridge is attachable to and detachable from an image forming apparatus.

(((12)))

An image forming apparatus comprising:

the electrophotographic photoreceptor according to any one of (((1))) to (((10)));

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing a toner to form a toner image; and a transfer device that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate; and a lamination type photosensitive layer including a charge generation layer and a charge transport layer or a single layer type photosensitive layer that is a photosensitive layer disposed on the conductive substrate, wherein the charge transport layer or the single layer type photosensitive layer is an outermost layer and contains a charge transport material and a binder resin containing a polyester resin having an aromatic ring, the charge transport layer or the single layer type photosensitive layer has an average thickness of 28 μm or greater and 50 μm or less, and a weight reduction ratio of the charge transport layer or the single layer type photosensitive layer from 30° C. to 175° C. in thermogravimetric analysis is 0.1% by mass or less, wherein the polyester resin is a polyester resin (1) having a dicarboxylic acid unit (A) represented by Formula (A) and a diol unit (B) represented by Formula (B), Formula (A)

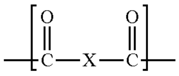

Formula (B)

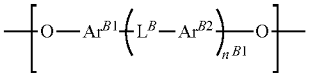

in Formula (A), X represents an organic group, in Formula (B), $Ar^{B1}$ and $Ar^{B2}$ each independently represent an aromatic ring that may have a substituent, $L^B$ represents a single bond, an oxygen atom, a sulfur atom, or —C($Rb^1$) ($Rb^2$)—, and $n^{B1}$ represents 0, 1, or 2, where $Rb^1$ and $Rb^2$ each independently represent a hydrogen atom, an alkyl group having 1 or more and 20 or less carbon atoms, an aryl group having 6 or more and 12 or less carbon atoms, or an aralkyl group having 7 or more and 20 or less carbon atoms, and $Rb^1$ and $Rb^2$ may be bonded to each other to form a cyclic alkyl group.

2. The electrophotographic photoreceptor according to claim 1, wherein the charge transport layer or the single layer type photosensitive layer further contains an antioxidant.

3. The electrophotographic photoreceptor according to claim 2, wherein the antioxidant has a molecular weight of 350 or less.

4. The electrophotographic photoreceptor according to claim 1, wherein the dicarboxylic acid unit (A) is a dicarboxylic acid unit (A') represented by Formula (A'), Formula (A')

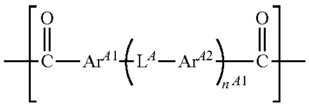

in Formula (A'), $Ar^{A1}$ and $Ar^{A2}$ each independently represent an aromatic ring that may have a substituent, $L^A$ represents a single bond or a divalent linking group, and $n^{A1}$ represents 0, 1, or 2.

5. The electrophotographic photoreceptor according to claim 1, wherein the dicarboxylic acid unit (A) includes at least one selected from the group consisting of a dicarboxylic acid unit (A1) represented by Formula (A1), a dicarboxylic acid unit (A2) represented by Formula (A2), a dicarboxylic acid unit (A3) represented by Formula (A3), and a dicarboxylic acid unit (A4) represented by Formula (A4), Formula (A1)

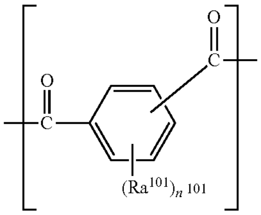

Formula (A2)

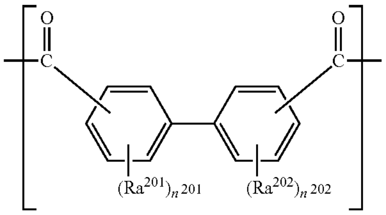

Formula (A3)

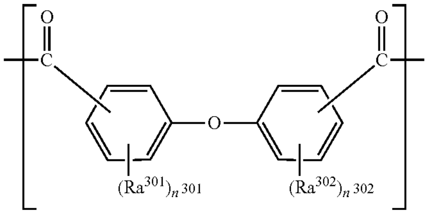

Formula (A4)

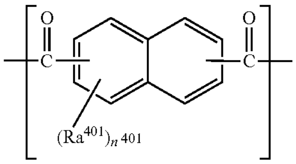

in Formula (A1), $n^{101}$ represents an integer of 0 or greater and 4 or less, and $n^{101}$ number of $Ra^{101}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A2), $n^{201}$ and $n^{202}$ each independently represent an integer of 0 or greater and 4 or less, and $n^{201}$ number of $Ra^{201}$'s and $n^{202}$ number of $Ra^{202}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A3), $n^{301}$ and $n^{302}$ each independently represent an integer of 0 or greater and 4 or less, and $n^{301}$ number of $Ra^{301}$'s and $n^{302}$ number of $Ra^{302}$'s each independently represent an alkyl group having 1 or more and 10 or less carbon atoms, an aryl group having 6 or more and 12 or less carbon atoms, or an alkoxy group having 1 or more and 6 or less carbon atoms, in Formula (A4), $n^{401}$ represents an integer of 0 or greater and 6 or less, and $n^{401}$ number of $Ra^{401}$'s each independently represent an alkyl group having 1 or more and 10 or less carbon atoms, an aryl group having 6 or more and 12 or less carbon atoms, or an alkoxy group having 1 or more and 6 or less carbon atoms.

6. The electrophotographic photoreceptor according to claim 1, wherein the diol unit (B) includes at least one selected from the group consisting of a diol unit (B1) represented by Formula (B1), a diol unit (B2) represented by Formula (B2), a diol unit (B3) represented by Formula (B3), a diol unit (B4) represented by Formula (B4), a diol unit (B5) represented by Formula (B5), a diol unit (B6) represented by Formula (B6), a diol unit (B7) represented by Formula (B7), and a diol unit (B8) represented by Formula (B8), Formula (B1)

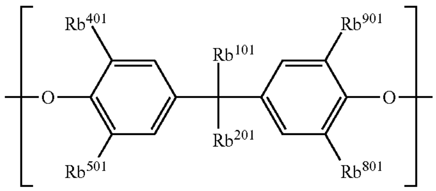

Formula (B2)

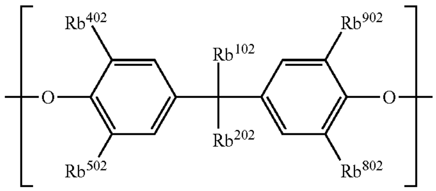

Formula (B3)

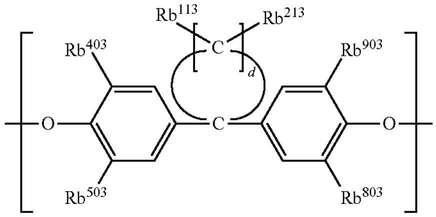

Formula (B4)

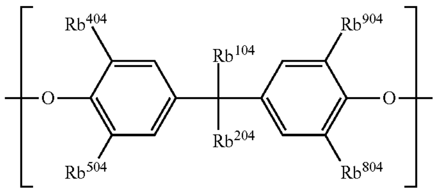

Formula (B5)

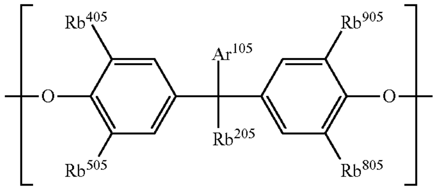

-continued

Formula (B6)

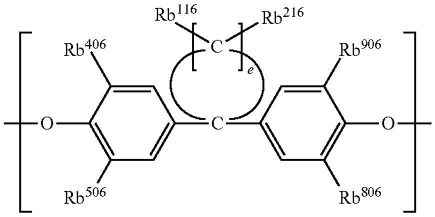

Formula (B7)

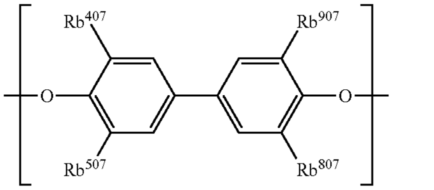

Formula (B8)

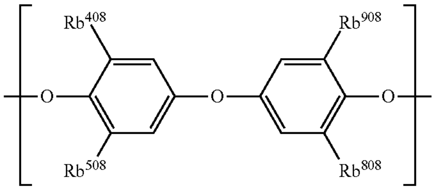

in Formula (B1), $Rb^{101}$ represents a branched alkyl group having 4 or more and 20 or less carbon atoms, $Rb^{201}$ represents a hydrogen atom or an alkyl group having 1 or more and 3 or less carbon atoms, and $Rb^{401}$, $Rb^{501}$, $Rb^{801}$, and $Rb^{901}$ each independently represent a hydrogen atom, an alkyl group having 1 or more and 4 or less carbon atoms, an alkoxy group having 1 or more and 6 or less carbon atoms, or a halogen atom, in Formula (B2), $Rb^{102}$ represents a linear alkyl group having 4 or more and 20 or less carbon atoms, $Rb^{202}$ represents a hydrogen atom or an alkyl group having 1 or more and 3 or less carbon atoms, and $Rb^{402}$, $Rb^{502}$, $Rb^{802}$, and $Rb^{902}$ each independently represent a hydrogen atom, an alkyl group having 1 or more and 4 or less carbon atoms, an alkoxy group having 1 or more and 6 or less carbon atoms, or a halogen atom, in Formula (B3), $Rb^{113}$ and $Rb^{213}$ each independently represent a hydrogen atom, a linear alkyl group having 1 or more and 3 or less carbon atoms, an alkoxy group having 1 or more and 4 or less carbon atoms, or a halogen atom, d represents an integer of 7 or greater and 15 or less, and $Rb^{403}$, $Rb^{503}$, $Rb^{803}$, and $Rb^{903}$ each independently represent a hydrogen atom, an alkyl group having 1 or more and 4 or less carbon atoms, an alkoxy group having 1 or more and 6 or less carbon atoms, or a halogen atom, in Formula (B4), $Rb^{104}$ and $Rb^{204}$ each independently represent a hydrogen atom, an alkyl group having 1 or more and 3 or less carbon atoms, and $Rb^{404}$, $Rb^{504}$, $Rb^{804}$, and $Rb^{904}$ each independently represent a hydrogen atom, an alkyl group having 1 or more and 4 or less carbon atoms, an alkoxy group having 1 or more and 6 or less carbon atoms, or a halogen atom, in Formula (B5), $Ar^{105}$ represents an aryl group having 6 or more and 12 or less carbon atoms or an aralkyl group having 7 or more and 20 or less carbon atoms, $Rb^{205}$ represents a hydrogen atom or an alkyl group having 1 or more and 3 or less carbon atoms, and $Rb^{405}$, $Rb^{505}$, $Rb^{805}$, and $Rb^{905}$ each independently represent a hydrogen atom, an alkyl group having 1 or more and 4 or less carbon atoms, an alkoxy group having 1 or more and 6 or less carbon atoms, or a halogen atom, in Formula (B6), $Rb^{116}$ and $Rb^{216}$ each independently represent a hydrogen atom, a linear alkyl group having 1 or more and 3 or less carbon atoms, an alkoxy group having 1 or more and 4 or less carbon atoms, or a halogen atom, e represents an integer of 4 or greater and 6 or less, and $Rb^{406}$, $Rb^{506}$, $Rb^{806}$, and $Rb^{906}$ each independently represent a hydrogen atom, an alkyl group having 1 or more and 4 or less carbon atoms, an alkoxy group having 1 or more and 6 or less carbon atoms, or a halogen atom, in Formula (B7), $Rb^{407}$, $Rb^{507}$, $Rb^{807}$, and $Rb^{907}$ each independently represent a hydrogen atom, an alkyl group having 1 or more and 4 or less carbon atoms, an alkoxy group having 1 or more and 6 or less carbon atoms, or a halogen atom, in Formula (B8), $Rb^{408}$, $Rb^{508}$, $Rb^{808}$, and $Rb^{908}$ each independently represent a hydrogen atom, an alkyl group having 1 or more and 4 or less carbon atoms, an alkoxy group having 1 or more and 6 or less carbon atoms, or a halogen atom.

7. The electrophotographic photoreceptor according to claim 1, wherein the charge transport layer or the single layer type photosensitive layer has an average thickness of 30 μm or greater and 50 μm or less.

8. The electrophotographic photoreceptor according to claim 1, wherein a weight reduction amount of the charge transport layer or the single layer type photosensitive layer from 30° C. to 175° C. in the thermogravimetric analysis is 0.18% by mass or less with respect to a total amount of the binder resin.

9. The electrophotographic photoreceptor according to claim 1, wherein in a case where the weight reduction ratio of the charge transport layer or the single layer type photosensitive layer from 30° C. to 175° C. in the thermogravimetric analysis is defined as W % by mass, and the average thickness of the charge transport layer or the single layer type photosensitive layer is defined as T μm, a value of W×T is 4.2 or less.

10. A process cartridge comprising:

the electrophotographic photoreceptor according to claim 1, wherein the process cartridge is attachable to and detachable from an image forming apparatus.

11. A process cartridge comprising:

the electrophotographic photoreceptor according to claim 2, wherein the process cartridge is attachable to and detachable from an image forming apparatus.

12. A process cartridge comprising:

the electrophotographic photoreceptor according to claim 3, wherein the process cartridge is attachable to and detachable from an image forming apparatus.

13. A process cartridge comprising:

the electrophotographic photoreceptor according to claim 4, wherein the process cartridge is attachable to and detachable from an image forming apparatus.

14. A process cartridge comprising:

the electrophotographic photoreceptor according to claim 5, wherein the process cartridge is attachable to and detachable from an image forming apparatus.

15. A process cartridge comprising:

the electrophotographic photoreceptor according to claim 6, wherein the process cartridge is attachable to and detachable from an image forming apparatus.

16. A process cartridge comprising:

the electrophotographic photoreceptor according to claim 7, wherein the process cartridge is attachable to and detachable from an image forming apparatus.

17. A process cartridge comprising:

the electrophotographic photoreceptor according to claim 8, wherein the process cartridge is attachable to and detachable from an image forming apparatus.

18. An image forming apparatus comprising:

the electrophotographic photoreceptor according to claim 1;

a charging device that charges a surface of the electrophotographic photoreceptor;

an electrostatic latent image forming device that forms an electrostatic latent image on the charged surface of the electrophotographic photoreceptor;

a developing device that develops the electrostatic latent image formed on the surface of the electrophotographic photoreceptor with a developer containing a toner to form a toner image; and a transfer device that transfers the toner image to a surface of a recording medium.

* * * * *